United States Patent
Yamada et al.

[11] Patent Number: 6,082,718
[45] Date of Patent: Jul. 4, 2000

[54] LIQUID-SEALING TYPE VIBRATION ISOLATING APPARATUS

[75] Inventors: Norihiro Yamada, Inazawa; Yoshiki Shimoda, Ichinomiya; Takashi Maeno, Aichi-ken; Shigeki Takeo, Nagoya; Osamu Nakagaki, Ichinomiya; Masanao Goto, Gifu-ken; Tetsuya Tsuiki, Aichi-ken; Tatsuo Suzuki, Inazawa; Tetsuo Asano, Komaki, all of Japan

[73] Assignee: Toyoda Gosei Co., Ltd., Aichi-ken, Japan

[21] Appl. No.: 09/035,933

[22] Filed: Mar. 2, 1998

Related U.S. Application Data

[63] Continuation-in-part of application No. 08/859,112, May 20, 1997, abandoned.

[30] Foreign Application Priority Data

| Mar. 3, 1997 | [JP] | Japan | 9-065446 |
| Mar. 10, 1997 | [JP] | Japan | 9-074587 |
| Mar. 21, 1997 | [JP] | Japan | 9-087758 |
| Mar. 28, 1997 | [JP] | Japan | 9-095086 |
| Jul. 24, 1997 | [JP] | Japan | 9-215911 |
| Jul. 30, 1997 | [JP] | Japan | 9-219929 |
| Sep. 16, 1997 | [JP] | Japan | 9-269317 |
| Nov. 20, 1997 | [JP] | Japan | 9-337898 |
| Dec. 25, 1997 | [JP] | Japan | 9-368525 |

[51] Int. Cl.⁷ ..................................................... F16F 5/00
[52] U.S. Cl. ................................ 267/140.14; 267/140.13; 248/636; 180/300
[58] Field of Search ........................ 267/140.11, 140.13, 267/140.14, 140.15, 219, 220; 248/636; 180/300, 902

[56] References Cited

U.S. PATENT DOCUMENTS

| 4,657,232 | 4/1987 | West | 267/140.1 |
| 4,756,513 | 7/1988 | Carlson et al. | 267/140.1 |
| 4,886,252 | 12/1989 | Haussermann | 267/140.1 |
| 5,145,156 | 9/1992 | Muramatsu et al. | 267/140.14 |
| 5,170,998 | 12/1992 | Muramatsu | 267/140.13 |
| 5,180,148 | 1/1993 | Muramatsu | 267/140.14 |
| 5,215,293 | 6/1993 | Muramatsu et al. | 267/140.14 |
| 5,246,212 | 9/1993 | Funahashi et al. | 267/140.13 |
| 5,314,173 | 5/1994 | Ide et al. | 267/140.14 |
| 5,393,041 | 2/1995 | Takano et al. | 267/140.14 |
| 5,437,438 | 8/1995 | Takano et al. | 267/140.14 |
| 5,769,402 | 6/1998 | Ide et al. | 267/140.14 |
| 5,839,720 | 11/1998 | Kojima | 267/140.14 |

FOREIGN PATENT DOCUMENTS

| 60-40843 | 3/1985 | Japan . |
| 6-29634 | 10/1986 | Japan . |
| 3-12639 | 1/1991 | Japan . |
| 3-125045 | 5/1991 | Japan . |
| 4-60231 | 2/1992 | Japan . |
| 4-277338 | 10/1992 | Japan . |
| 5-149369 | 6/1993 | Japan . |

*Primary Examiner*—Robert J. Oberleitner
*Assistant Examiner*—Pamela J. Lipka
*Attorney, Agent, or Firm*—Pillsbury Madison & Sutro LLP

[57] ABSTRACT

A liquid-sealing type vibration isolating apparatus including a first coupling member attached to a vibrator; a second coupling member attached to a member in a vehicle body; an insulator interposed between the coupling members, for absorbing and isolating vibration from the vibrator; a vibration isolating mechanism composed of a main chamber having a chamber wall formed by a portion of the insulator, and charged therein with liquid, an auxiliary chamber communicated with the main chamber through an orifice and having a chamber wall a portion of which is formed by a first diaphragm, an air chamber partitioned from the auxiliary chamber across the first diaphragm, and an equilibrium chamber partitioned from the auxiliary chamber across a second diaphragm; a selector for carrying out change-over operation so as to introduce negative pressure or the atmospheric pressure into the equilibrium chamber in the vibration isolating mechanism control for controlling the change-over operation of the selector, a negative pressure tank provided between a negative pressure source and the selector, and a check valve formed between the negative pressure tank and the negative pressure source, for allowing introduction of only negative pressure, and a solenoid mechanism for driving the selector.

23 Claims, 13 Drawing Sheets

LIQUID-SEALING TYPE VIBRATION ISOLATING APPARATUS

CROSS REFERENCE TO RELATED APPLICATION

This is a continuation in part of patent application Ser. No. 08/859,112 filed on May 20, 1997, now abandoned.

BACKGROUND OF THE INVENTION

1. Field of the Invention

The present invention relates to a liquid-sealing type vibration isolating apparatus which can obtain a vibration-isolating effect on the basis of the flowing action by liquid charged therein, and in particular, to at negative pressure introduction type liquid-sealing type vibration isolating apparatus which can change the vibration-proof characteristic exhibited in association with fluid action of liquid among several stages in response to negative pressure of intake air of an engine which is changed over by a selector means.

2. Description of Related Art

Among various kinds vibration isolators, an engine mount for an automobile or the like has to deal with any frequency over a wide range since an engine, as a power source, is used under various conditions, in a wide range from an engine idling speed to a maximum speed of revolution. Accordingly, in order to cope with such varied conditions, there have been proposed a liquid-sealing type vibration isolating apparatus provided therein with a liquid chamber accommodating a fluid bag whose volume varies in accordance with a specific frequency, and a liquid-sealing type vibration isolating apparatus provided therein with equilibrium chambers which are partitioned and defined by a diaphragm or the like. For example, Japanese Patent Publication No. 6-29634 discloses that the above-mentioned vibration isolators have been well-known. In the above-mentioned conventional apparatus, when idling vibration is inputted, the fluid bag or the diaphragm is operated in order to prevent the pressure of liquid in a main chamber from increasing, so as to lower the spring constant of the overall suspension system (vibration-isolating system) with respect to the idling vibration. Meanwhile, as to a problem of engine shake which may occur during running of a vehicle, a negative pressure is continuously introduced into the above-mentioned fluid bag or equilibrium chambers defined by the diaphragm so as to cause liquid to flow from a main liquid chamber into an auxiliary chamber by way of an orifice when vibration caused by engine shake is inputted. That is, when engine shake is inputted, the pressure of liquid in the main chamber is increased, and then, the liquid is caused to flow from the main chamber to the orifice in order to obtain a high vibration damping property. However, such a conventional vibration isolating apparatus requires a special fluid pressure generating means for setting the pressure in the fluid bag or the equilibrium chamber to a predetermined pressure. The inventors have already proposed a negative pressure introduction type liquid-sealing type vibration isolating adapted to introduce a negative pressure into an equilibrium chamber when the latter is operated, which utilizes a negative pressure of engine intake air as a negative pressure source.

In general, in a liquid-sealing type vibration isolating apparatus, air is sometimes trapped in small gaps defined between various components during the assembly thereof. Thus, trapped air is later mingled into a liquid chamber in the form of air bubbles so as to possibly deteriorate the vibration-isolating property. In order to prevent occurrence of the problem of mingling air, the components are assembled in a container in which a predetermined liquid is filled. That is, the assembly is carried out in the liquid.

In such an engine intake negative pressure introduction type apparatus, the value of intake negative pressure varies, possibly in general, due to variation in engine speed or the like. Further, due to a fluid resistance of a pipe line passage between a negative pressure source and a selector means, or the like, the value of negative pressure lowers so as to possibly cause the force induced in the equilibrium chamber to decrease.

The liquid used in such an assembly, that is, the liquid to be sealed in the liquid chamber, is mingled therein with rust preventines in order to allow the liquid-sealing type vibration isolating apparatus filled therein with the liquid to be used for a long time. Further, such preventives tend to deposit powder-like solid components when the sealed liquid is evaporated and dried. Thus, a liquid-sealing type vibration isolating apparatus having an equilibrium chamber into which gas having a negative pressure, an atmospheric pressure or the like is introduced, is assembled in liquid containing such rust preventives, and then, the liquid is discharged from the equilibrium chamber after assembling. Thereafter, if it is used in a dried condition, powder-like solid components possibly separate in the equilibrium chamber. As a result, hindrance is caused in the operation of a selector valve or the like for alternately introducing negative pressure or the atmospheric pressure into the equilibrium chamber due to deposition of the powder-like solid component.

Meanwhile, there has been known such a counter-measure against dull sound in a frequency range (about 60 to 80 Hz) higher than that of idling vibration, that a movable member is located in the main liquid chamber which is displaced so as to lower the pressure of liquid in order to absorb and lower vibration. Further, there has been also known that such a movable member is located in the negative pressure chamber as disclosed in Japanese Laid-Open Patent No. 4-277338 in which a resilient constraint member is located in the negative pressure chamber so that an elastic membrane defining a third liquid chamber is attracted to the resilient constraint member in order to deform both the elastic membrane and the resilient constraint member together when negative pressure is exerted to the elastic membrane.

However, the above-mentioned conventional arrangement have had a large number of required components for changing over the vibration isolating property is large, and further, requires definition of a space at the rear surface of the resilient constraint member, for allowing displacement of the resilient constraint member.

In the conventional arrangement as mentioned above, the fluid bag, the diaphragm or the like is operated so as to reduce the overall dynamic spring constant of the vibration isolating apparatus with respect to idling vibration. Further, as to the problem of engine shake occurring during running of a vehicle, negative pressure or the like is continuously introduced into the negative pressure chamber (equilibrium chamber) or the like defined by the fluid bag or the diaphragm in order to cause liquid to positively flow from the main chamber into the auxiliary chamber by way of an orifice. That is, the liquid is caused to flow through the orifice from the main chamber so as to obtain a high damping property. In this system, a pair of the above-mentioned liquid-sealing type vibration isolating apparatus (vibration isolating units) are arranged at the front and rear sides of a vibrating apparatus such as an engine, or the left and right sides thereof, and negative pressure or the atmospheric pressure is selectively fed into the equilibrium chambers in these vibration isolating apparatuses in an appropriate manner. Accordingly, selector means or the like for controlling the selection of either negative pressure or the atmospheric pressure fed into the equilibrium chamber defined in each of these liquid-sealing type vibration isolating apparatuses, or the like are provided respectively for the left and right isolating apparatuses. As a result, there has been raised a problem such that the selector means, a control mechanism and the like should have a large-scale.

SUMMARY OF THE INVENTION

The present invention is made to solve the above-mentioned problems, and accordingly, an object of the present invention is to provide a negative pressure introduction type and liquid sealing type vibration isolating apparatus using intake negative pressure of an engine, which causes less variation force induced in an equilibrium chamber, and which can inhibit the value of negative pressure introduced in the equilibrium chamber from lowering.

Further, according to the present invention, in order to solve the above-mentioned problems, another object of the present invention is to provide a method of assembling a liquid-sealing type vibration isolating apparatus, in which liquid prepared so as to contain no rust preventines is introduced into an equilibrium chamber during assembling of the vibration isolating apparatus.

A further object of the present invention is to provide a liquid-sealing type vibration isolating apparatus which has a simple structure so as to be simply manufactured, and which can exhibit a satisfactory vibration-isolating property over a wide range.

In order to solve the above-mentioned problems, another object of the present invention is to provide a liquid-sealing type vibration isolating apparatus system in which a set of negative pressure-introduction type and liquid-sealing type vibration isolating apparatus (vibration isolating units) are mounted to a vibrator such as an engine, a single selector means for controlling the operation of the vibration isolating apparatuses, is provided.

A still further object of the present invention is to provide a negative pressure introduction type and liquid-sealing type vibration isolating apparatus having a diaphragm which can be balanced upon the introduction of negative pressure and upon the introduction of the atmospheric pressure, which is operated (vibrated) in different conditions upon introduction of negative pressure and upon introduction of the atmospheric pressure, that is, which is asymmetrically vibrated.

In order to solve the above-mentioned problems, an additional object of the present invention is to provide a liquid-sealing type vibrating apparatus isolating apparatus which can ensure a sufficient pressure receiving area for a rubber membrane (flexible member).

Another object of the present invention is to provide a liquid-sealing type vibration isolating apparatus which can be easily assembled so as to have excellent workmanship, and which can have a stable quality without unevenness in orifice lengths of products.

A further object of the present invention is to provide an active control type and liquid-sealing type vibration isolating apparatus in which the structure of an external take-out portion of a control means for moving a movable member is provided to a partition panel to facilitate the assembly thereof and to enhance the workmanship thereof.

To achieve the above-mentioned objects of the invention, the following features of the constructions are provided. A first concept of the present invention includes a liquid-sealing type vibration isolating apparatus comprising a first coupling member attached to a vibrator, a second coupling member attached to a member or the like on the vehicle body side, and an insulator provided between the first and second members, for absorbing or isolating vibration transmitted from the vibrator. The apparatus further comprises a main chamber having a chamber wall formed by a portion of the insulator, and enclosed therein with liquid, an auxiliary chamber and a partition panel partitioned from the main chamber across a partition wall and connected to the main chamber through an orifice and having a chamber wall a portion of which is defined by a first diaphragm, an air chamber partitioned from the auxiliary chamber across the first diaphragm, and a vibration isolating mechanism including an equilibrium chamber defined in the main chamber by a second diaphragm. The apparatus also comprises selector means for carrying out selection for introducing either negative pressure or the atmospheric pressure into the equilibrium chamber in the vibration isolating mechanism, and control means for controlling the selection of the selector means, a negative pressure tank provided between a negative pressure source using intake negative pressure of an engine and the selector means, and having a predetermined volume, a check valve provided between the negative pressure tank and the negative pressure source and adapted to introduce only negative pressure into the negative pressure tank, and a solenoid mechanism serving as drive means for driving a selector valve in the selector means.

This arrangement of the present invention can exhibit the following functions. That is, the selector means is operated against idling vibration so as to alternately introduce the negative pressure and the atmospheric air into the equilibrium chamber at a specific frequency. That is, the selector means is operated at the specific frequency so as to change the pressure (volume) of the inside of the equilibrium chamber in order to absorb variation in liquid pressure in the main chamber, which is caused by idling vibration inputted through the insulator. As a result, the dynamic spring constant of a spring system composed of the insulator and the vibration isolating mechanism can be reduced.

Further, as to vibration caused by engine shake which is a problem occurring during the running of a vehicle, negative pressure having a predetermined value is continuously introduced into the equilibrium chamber constituting the vibration isolating mechanism so as to pull down the second diaphragm defining the equilibrium chamber in order to reduce the volume of the equilibrium chamber to zero. Thus, it is possible to prevent a third liquid chamber communicating with the main chamber from changing, its interior volume. In this condition, when vibration is transmitted from the vibrator to the insulator, the lower surface portion of the insulator vibrates in response to the vibration so as to positively cause liquid to flow from the main chamber into the auxiliary chamber through the first orifice. A viscous resistance induced when the liquid flows, exhibits a predetermined damping force which can restrain (damp) engine shake.

Further, the arrangement of the present invention having the above-mentioned function, the negative pressure tank having a predetermined volume is provided between the negative pressure source using engine intake negative pressure and the selector means, and the check valve is arranged on the negative pressure source side. Thus, the negative pressure which is always stable can be introduced into the equilibrium chamber. Further, the value of negative pressure introduced in the equilibrium chamber, caused by a pipe line resistance or the like can be prevented from being lowered, thereby making it possible to maintain a force induced in the equilibrium chamber at a high value.

According to a second aspect of the first concept of the present invention, the partition wall can be constituted with the body having its outer peripheral portion formed therein with the first orifice, the second diaphragm provided on the main chamber side of the body and defining the equilibrium chamber between itself and the body, and the partition panel arranged between the second diaphragm and the main chamber, defining the third chamber between itself and the second diaphragm and formed therein with the second orifice.

With this arrangement, when negative pressure is introduced in the equilibrium chamber, the second diaphragm is attracted to the opposed surface so that its movement is restrained, but the diaphragm can be moved by a slight displacement in parts facing the small gaps. Accordingly, when vibration causing a distinguishable sound is inputted, this vibration can be absorbed through the slight vibration of the second diaphragm. Further, when shake vibration at a low frequency is inputted in this condition, liquid flows from the main chamber into the auxiliary chamber by way of the first orifice since the movement of the second diaphragm is restrained, and accordingly, effective vibration damping can be carried out. When idling vibration is inputted, the equilibrium chamber is opened to the atmospheric pressure so as to allow the second diaphragm to move freely, and accordingly, liquid flows through the second orifice which operates at a higher frequency, so as to damp the vibration.

According to a third aspect of the first concept of the present invention, a liquid-sealing type vibration isolating apparatus has a construction which is basically the same as that of the first aspect, except that a negative pressure sub-tank is provided, as close as possible to the selector means, on the side remote from the equilibrium chamber, having a volume which is equal to or slightly larger than the sum of the inside volume of the equilibrium chamber and the volume of a passage communicating between the equilibrium chamber and the selector means.

With this arrangement according to the present invention, the value of negative pressure introduced in to the equilibrium chamber can be always maintained at a high negative pressure value nearly equal to that of intake negative pressure of an engine. In general, a long negative pressure hose has conventionally been provided between the negative pressure source using intake negative pressure of an engine and the selector means or the equilibrium chamber into which the negative pressure is introduced by way of the selector means. Accordingly, negative pressure having a value which has been lowered from the value of engine intake negative pressure due to the fluid flow resistance of the negative pressure hose is introduced into the equilibrium chamber. On the other hand, according to the present invention, since the negative pressure sub-tank having a predetermined volume is provided in the vicinity of the selector means, high negative pressure always held at a predetermined value can be introduced into the equilibrium chamber. As a result, the diaphragm (second diaphragm) defining the equilibrium chamber always produces high energy.

According to a fourth aspect of the first concept of the present invention, a liquid-sealing type vibration isolating apparatus has a construction which is basically the same as that of the first or second concept, except that the selector valve in the selector means is operated so as to always introduce the atmospheric air into the equilibrium chamber whenever an engine is not operated. With this arrangement according to the present invention, the following functions can be expected. That is, upon the stopage of the engine, the selector valve in the selector means opens its atmospheric pressure introduction side valve so as to introduce the atmospheric air into the equilibrium chamber. Accordingly, during nonoperation of the vibration isolating mechanism, that is, during a rest of the engine, the second diaphragm defining the equilibrium chamber can be prevented from being left in an attracted condition. As a result, it is possible to prevent fatigue of the second diaphragm or to prevent the same from being attracted to the bottom surface portion of the equilibrium chamber.

Next, according to a fifth aspect of the first concept of the present invention, a liquid-sealing type vibration isolating apparatus has a construction which is basically the same as that of either one of those of the first to third concepts, except that the direction of operation of the solenoid constituting the selector means has an angle of greater than 45 deg. to the operating axis of the liquid-sealing type vibration isolating apparatus. With this arrangement of the present invention, the operating direction of the solenoid constituting the selector means, that is, the direction of the vibration thereof does not coincide with the direction of vibration of the vibration isolating mechanism in the body of the vibration isolating apparatus, and accordingly, vibration energy of the selector valve caused by the operation of the solenoid can be cancelled out by vibration energy of the vibration isolating mechanism. Thus, it is possible to prevent vibration from being transmitted from the selector valve to the vehicle body by way of members of the liquid-sealing type vibration isolating apparatus. As a result, a method of attaching the selector means to the liquid-sealing type vibration isolating apparatus can eliminate the necessity of provision of a vibration-isolating rubber element or the like therebetween. Accordingly, the selector means can be attached directly to the vibration isolating apparatus with the use of a metal bracket or the like, thereby enabling the number of required components to be reduced, and the overall weight of the vibration isolator.

Further, in order to solve the above-mentioned problems, according to a second concept of the present invention, as a first concept thereof, there is provided a method of assembling a negative pressure-introduction type liquid-sealing type vibration isolating apparatus in which negative pressure or the atmospheric pressure are alternately introduced. The method comprises the steps of integrally incorporating an exciting diaphragm which defines a portion of a chamber wall of an equilibrium chamber, with a partition panel defining the equilibrium chamber in cooperation with the exciting diaphragm within predetermined liquid which has been prepared so that no solid component as a residual is deposited even though it is evaporated, in order to obtain an exciting mechanism, and assembling the exciting mechanism and a vibration isolating mechanism including an insulator which is arranged around the vibration exciting mechanism, which defines a liquid chamber and which exhibits a vibration isolating function, with each other in liquid which will be later charged in the liquid chamber and which contains an additive which is left as a residue in the form of a solid component after the liquid is evaporated.

With the above-mentioned method, no solid component is deposited in the equilibrium chamber of the liquid-sealing type vibration isolating apparatus even though the latter has been used for a long time. As a result, it is possible to eliminate such a risk that a powder-like deposition hinders the operation of the selector valve or the like. Further, since the all assembling steps including the step of assembling the exciting mechanism, can be carried out in liquid, no air is trapped in gaps between the assembled components, thereby making it possible to eliminate a fear that air is mingled into the liquid. As a result, it is possible to eliminate a risk that the dynamic spring property varies due to mingling of air into the liquid chamber. Accordingly, it is possible to maintain a stable vibration isolating property.

Further, according to a second aspect of the second concept of the present invention, a method of assembling a negative pressure introduction type vibration isolator comprising the steps which are basically the same as those of the first aspect, except that the step of sealingly closing an introduction passage communicating with the equilibrium chamber constituting the exciting mechanism, with the use of a predetermined means, is added, prior to the step of integrally incorporating the exciting mechanism with the vibration isolating mechanism. With this added step, the equilibrium chamber constituting the exciting mechanism, and the introduction passage are sealingly enclosed so that a liquid which will deposit a solid-like component later, such as rust preventives, will not enter the equilibrium chamber and the introduction passage even though the assembling process is performed in the liquid which will deposit a solid-like component. As a result, the assembling work of the exciting mechanism and the vibration isolating mechanism can be carried out more smoothly.

Further, according to a fifth aspect of the first concept of the present invention, includes a liquid-sealing type vibration isolating apparatus comprising a main chamber having a chamber wall formed of a rubber elastic material having a large wall thickness, and an auxiliary chamber having a chamber wall formed of a thin rubber membrane. Opposed to the main chamber across a hollow partition wall is a first orifice communicating the auxiliary chamber with the main chamber, for damping vibration at a predetermined frequency with the use of action of liquid flowing through the orifice. The apparatus further comprises a second diaphragm stretched in the hollow partition wall, a third chamber formed on the main chamber side of the second diaphragm, an equilibrium chamber formed on the auxiliary chamber side of the second diaphragm, and adapted to cause the second diaphragm to be attracted to the outer surface of the partition wall which faces thereto, when negative pressure is introduced thereinto, a second orifice communicating the third chamber with the main chamber and adapted to operate at a frequency which is higher than that of the first orifice. The apparatus also includes selector means for carrying out change-over operation so as to introduce negative pressure or the atmospheric pressure into the equilibrium chamber in the vibration isolating mechanism, and control means for controlling the change-over operation of the selector means. More than one protrusion are formed on one or both of a surface of the second diaphragm which faces the equilibrium chamber and an inner surface of the partition wall, and accordingly, when negative pressure is introduced, a small gap is maintained between the second diaphragm and the inner surface of the partition wall when negative pressure is introduced into the equilibrium chamber.

With this arrangement, when negative pressure is introduced in the equilibrium chamber, the second diaphragm is attracted to the opposed surface so that its movement is restrained, but the diaphragm can be moved by a slight displacement in parts facing the small gaps which are defined and maintained by the protrusions. Accordingly, when vibration causing a distinguishable sound is inputted, this vibration can be absorbed through the slight vibration of the second diaphragm. Further, when a shake vibration at a low frequency is inputted in this condition, liquid flows from the main chamber into the auxiliary chamber by way of the first orifice since the movement of the second diaphragm is restrained, and accordingly, effective vibration damping can be carried out. When idling vibration is inputted, the equilibrium chamber is opened to the atmospheric pressure so as to allow the second diaphragm to move freely, and accordingly, liquid flows through the second orifice which operates at a higher frequency, so as to damp the vibration.

With the above-mentioned arrangement, vibration at different frequencies can be satisfactorily damped. Further, since it is not necessary to increase the number of required components although the shapes of existing components are modified, the liquid-sealing type vibration isolating apparatus according to the present invention can have a simple and compact structure, thereby making it possible to easily manufacture it.

More specifically, the partition wall can be constituted with the body having its outer peripheral portion formed therein with the first orifice, the second diaphragm provided on the main chamber side of the body and defining the equilibrium chamber between itself and the body, and the partition panel arranged between the second diaphragm and the main chamber, defining the third chamber between itself and the second diaphragm and formed therein with the second orifice.

The protrusions are formed on the center portion and the peripheral portion of the elastic membrane or the body. Further, if a raised wall projected toward the body is formed at the peripheral edge of the elastic membrane, having an end portion which is fixed to an annular protrusion formed on the outer peripheral portion of the body, the small gaps can be easily formed.

Further, in order to solve the above-mentioned problem, there is provided a system comprising two liquid-sealing type vibration isolating units each composed of an upper coupling member attached to a vibrator, a lower coupling member attached to a vehicle side member or the like, and an insulator arranged between the upper and lower coupling members, for absorbing and isolating vibration transmitted from the vibrator. The system further comprises a main chamber having a chamber wall formed by a portion of the insulator and charged therein with liquid, an auxiliary chamber connected to the main chamber through an orifice and having a chamber wall a portion of which is formed by a first diaphragm, an air chamber partitioned from the auxiliary chamber across the first diaphragm, and an equilibrium chamber partitioned from the main chamber across a second diaphragm. The two liquid-sealing type vibration isolating apparatuses are provided respectively on opposite sides of the vibrator. The apparatus further comprises a single selector means connected to the respective equilibrium chambers of the these liquid-sealing type vibration isolating units, and for continuously introducing either one of negative pressure and the atmospheric pressure into the equilibrium chambers or alternately introducing the negative pressure and the atmospheric pressure into the equilibrium chambers in synchronization with the vibration of the engine. One of the equilibrium chambers is connected with the selector means through a passage which is formed so that variation in pressure is transmitted in synchronization with vibration (frequency) of the engine while the other one of the equilibrium chamber is connected therewith through a passage which is formed so that no variation in pressure is transmitted from the selector means at a frequency higher than the frequency at which the variation in pressure is synchronized with the vibration of the engine. The apparatus also includes control means for controlling selecting operation of the thus arranged selector means.

With this arrangement according to the present invention, the following functions can be exhibited. When the idling vibration is inputted, the selector means is operated so as to alternately introduce negative pressure and the atmospheric pressure into the liquid-sealing type vibration isolating unit at a specific frequency. With this function, negative pressure and the atmospheric pressure are alternately introduced in the equilibrium chamber in one of the fluid-sealing type vibration isolating unit, which is provided nearby from the selector means. As a result, the pressure (volume) in the equilibrium chamber varies so as to absorb variation in liquid pressure in the main chamber, which is caused by idling vibration inputted through the insulator. This liquid pressure action can lower the dynamic spring constant of the spring system constituted by the nearby vibration isolating unit.

Meanwhile, since the equilibrium chamber in the other one of the vibration isolating units, which is provided in the remote side, is connected through a route by which is established such that pressure variation in synchronization with engine vibration (frequency) is not transmitted to the equilibrium chamber, negative pressure and the atmospheric pressure which are introduced through the selector means are not alternately changed over as on the nearby side, and accordingly, the negative pressure and the atmospheric pressure are averaged. That is, as shown in FIG. 8, a substantially uniform pressure (atm.) which is slightly lower the atmospheric pressure is introduced. As a result, the equilibrium chamber on the remote side is maintained in a condition which is nearly equal to such a condition that it is opened to the atmospheric pressure, and accordingly, the diaphragm defining the equilibrium chamber is set to be in a freely vibrating condition. In this condition, when idling vibration is transmitted to the main chamber constituting the vibration isolating unit, liquid in the main chamber is subjected to variation in liquid pressure, and this liquid pressure variation is transmitted to the diaphragm defining the equilibrium chamber. Further, since the diaphragm is set to be ready to freely vibrate, the diaphragm freely vibrates soon to absorb the liquid pressure variation in the main chamber. As a result, even though the idling vibration is inputted, the liquid pressure in the main chamber does not rise, and accordingly, the dynamic spring constant of the spring system constituted by this vibration isolating unit is not increased. That is, it is possible to aim at lowering the dynamic spring constant, and accordingly, idling vibration is isolated even in the remote vibration isolating unit.

Next, when engine shake having a frequency which is lower than that of the above-mentioned idling vibration, the liquid flows through the orifice communicating between the main chamber and the auxiliary chamber, and accordingly, it is possible to specifically aim at absorbing and isolating the engine shake. That is, according to the present invention, the selector means is at first operated so as to continuously introduce negative pressure into the equilibrium chambers of the one set of the vibration isolating units. That is, the selector means is operated so as to introduce the negative pressure into the equilibrium chambers. In this case, the negative pressure is continuously introduced into the equilibrium chambers of both the nearby and remote vibration isolating units, and accordingly, the equilibrium chambers are both held in a condition in which their volumes are zero. As a result, in each of the vibration isolating units, the liquid flows through the orifice formed between the main chamber and the auxiliary chamber, the viscous resistance induced by this flow of the liquid produces a predetermined damping force. Further, this damping force (high damping characteristic) damps (sustains) the above-mentioned engine shake. Thus, according to the present invention, both the idling vibration and the engine shake can be efficiently absorbed and isolated only by operating only one selector means.

Further, in order to solve the above-mentioned problems, according to the present invention, there is provided a system comprising two liquid-sealing type vibration isolating units each composed of an upper coupling member attached to a vibrator, a lower coupling member attached to a vehicle side member or the like, and an insulator arranged between the upper and lower coupling members, for absorbing and isolating vibration transmitted from the vibrator. The system further comprises a main chamber having a chamber wall formed by a portion of the insulator and charged therein with liquid, an auxiliary chamber connected to the main chamber through an orifice and having a chamber wall, a portion of which is formed by a first diaphragm, an air chamber partitioned from the auxiliary chamber across the first diaphragm, and an equilibrium chamber partitioned from the main chamber across a second diaphragm. The two liquid-sealing type vibration isolators are provided respectively on opposite sides of the vibrator. The system also includes a single selector means connected to the respective equilibrium chambers of the these liquid-sealing type vibration isolating units, and for continuously introducing either one of negative pressure and the atmospheric pressure into the equilibrium chambers or alternately introducing the negative pressure and the atmospheric pressure into the equilibrium chambers in synchronization with vibration of the engine. One of the equilibrium chambers is connected with the selector means so that variation in pressure is transmitted in synchronization with vibration (frequency) of the engine while the other one of the equilibrium chamber is connected therewith through a phase control means. The system also includes control means for controlling selecting operation of the thus arranged selector means.

With this arrangement, according to the present invention, the following functions can be exhibited: when the idling vibration is inputted, the selector means is at first operated so that the negative pressure and the atmospheric pressure are alternately introduced into the liquid-sealing type vibration isolating units at a specific frequency. Thus, negative pressure and the atmospheric pressure are alternately introduced into one of the liquid-sealing type vibration isolating units at a specific frequency. As a result, the pressure (volume) in the equilibrium chamber varies so that variation in the pressure of liquid in the main chamber, which is caused by the idling vibration inputted through the insulator can be controlled. This liquid pressure control action can control the absolute spring constant (total spring constant) and the phase of a spring system constituted by one of the vibration isolating unit.

Further, in this arrangement, variations in pressure of the negative pressure and the atmospheric air which are controlled by the conversion of phases by the phase control means which is intermediately provided to the equilibrium chamber of the other vibration isolating unit are transmitted to the equilibrium chamber in the other of the vibration isolating units. That is, the variations in pressure of the negative pressure and the atmospheric air which have been alternately changed over are transmitted to the equilibrium chamber of the other vibration isolating unit after its phase is adjusted to a specific value, with respect to the phase of the variations in pressure which is transmitted to the one vibration isolating unit. The phase difference between the pressure variations transmitted to the two vibration isolating units is set in general to an angle of 180 deg. As a rule, the so-called resulted vector value which is represented as the total of input loads in consideration with their respective directions with respect to the vibration isolating units, is set to a value which is nearly equal to zero(0). In this condition, when an idling vibration is transmitted to the main chamber in the vibration isolating unit, the liquid in the main chamber is subjected to pressure variations. However, since the equilibrium chamber of the vibration isolating unit according to the present invention is controlled so as to cause the pressure (volume) variations having a specific phase with respect to the one vibration isolating unit, the above-mentioned liquid pressure variations are controlled through the volume variations of the equilibrium chamber. That is, when the idling vibration is inputted, the vector value of the suspension system (vibration isolating system) becomes a value nearly equal to zero (0), and accordingly, it is possible to aim at isolating the idling vibration.

Further, explanation will be made of another arrangement in this regard. This arrangement is basically the same as that of the vibration isolating system having the negative pressure introduction type vibration isolating units as mentioned above, except that the phase control means is provided in a passage communicating between the selector means and the one of the equilibrium chambers, and is composed of an expansion chamber having a predetermined volume and a diaphragm provided in this expansion chamber having a predetermined spring constant.

With this arrangement, according to the present invention, the phase control of pressure variation transmitted to one of the equilibrium chambers can be made by a simple diaphragm mechanism. That is, the phase conversion (control) can be made by a space (expansion chamber) and the diaphragm provided therein. That is, the phase control means can be located in a narrow space. Further, since a not so long passage is required, it is possible to prevent the output from lowering, thereby enabling the apparatus to aim at enhancing the output power of the vibration isolating unit.

Next, explanation will be made of another arrangement. This arrangement is basically the same as that of the vibration isolating system having the negative pressure-introduction type and liquid-sealing type vibration isolating units as mentioned above, except that the phase control means is provided in a passage communicating between the selector means and one of the equilibrium chambers, and is composed of an expansion chamber located in the expansion chamber and having a predetermined volume, a diaphragm having a predetermined spring constant, and a mass provided to the diaphragm and having a predetermined mass weight.

With this arrangement, according to the present invention, the following function can be exhibited: by suitably selecting a spring constant of the diaphragm or a mass weight of the mass, the phase of pressure variation in the equilibrium chamber on the side on which the pressure variation is introduced by way of the phase control means can be set optionally. As a result, the vibration isolating property of the suspension system (vibration isolating system) can be optionally set, thereby making it possible to exhibit a vibration isolating effect against a maximum idling vibration.

Further, in order to solve the above-mentioned problems, according to the present invention, there is provided a liquid-sealing type vibration isolating apparatus comprising a vibration isolating mechanism including a first coupling member attached to a vibrator, a second coupling member attached to a vehicle body side member or the like, and an insulator located between the first and second coupling members, for absorbing and isolating vibration transmitted from the vibrator. The apparatus further comprises a main chamber connected in series to the isolator and charged therein with liquid as incompressive fluid, an auxiliary chamber coupled to the main chamber so that the liquid flow between itself and the main chamber through in orifice and an equilibrium chamber defined in the main chamber by a diaphragm and adapted to be introduced therein with either one of the atmospheric pressure and negative pressure. The apparatus also comprises a selector means for carrying out a change-over operation for introducing either one of the atmospheric pressure and the negative pressure into the equilibrium chamber in the vibration isolating mechanism, a control means for controlling the change-over operation of the selector means, a passage for introducing the atmospheric pressure into the selector means and a passage for introducing negative pressure into the selector means. The cross-sectional area of the passage introduces the atmospheric pressure which is greater than or equal to that of the passage for introducing the negative pressure.

With this arrangement, according to the present invention, the following function can be exhibited: The diaphragm defining the equilibrium chamber is attracted by a predetermined stroke value by negative pressure introduced from a predetermined negative pressure source during negative pressure introduction stroke. Meanwhile, during atmospheric introduction stroke, the diaphragm operates (vibrates) by a predetermined stroke value due to its self-restorability. Further, due to this stroke (vibration) caused by the self-restorability, a predetermined volume of the atmospheric air is introduced in the equilibrium chamber by way of the atmospheric air introduction passage and the selector means. With respect to the negative pressure introducing stroke and the atmospheric air introducing stroke, since the cross-sectional area of the atmospheric air introducing passage is greater than that of the negative pressure introducing passage, the volume per stroke of the fluid (atmospheric pressure) introduced into or discharged from the equilibrium chamber can be balanced between both the two stroke cases.

That is, in both the negative pressure introduction stroke and the atmospheric introduction stroke, the work load exhibited by the equilibrium chamber or the diaphragm can be balanced so that the idling vibration can be efficiently isolated. Further, fatigue or the like of the diaphragm which is displaced (deformed) only toward the suction side through the introduction of negative pressure can be prevented.

Further, in order to solve the above-mentioned problem, according to the present invention, there is provided a liquid-sealing type vibration isolating apparatus comprising an upper coupling member attached to a vibrator, a lower coupling member attached to a vehicle body, an insulator provided between the upper and lower coupling members, for absorbing and isolating vibration from the vibrator. The apparatus further includes a main chamber and an auxiliary chamber connected in series to the insulator, and charged therein with liquid as a noncompressive fluid, ring-like orifice through which the main chamber and the auxiliary chamber communicate, a partition panel partitioning between the main chamber and the auxiliary chamber, an air chamber defined in the lower portion of the auxiliary chamber by a rubber membrane-like diaphragm, and a flexible member provided at a position where the partition panel is located, or at a position between the partition panel and the main chamber, facing the main chamber. The flexible member is being deformed in response to variation in pressure of liquid in the main chamber, and the flexible member is arranged, eccentric (offset) from the ring center point of the ring-like orifice by a predetermined degree.

With this arrangement, according to the present invention, the following function can be exhibited: Among various kind of vibrations inputted to the liquid-sealing type vibration isolating apparatus, idling vibration or low frequency vibration relating to engine shake or the like, can be absorbed and isolated through the action of the above-mentioned insulator, the action of the liquid charged in the main chamber and the auxiliary chamber, fluidic action of the liquid flowing through the orifice communicating between both the chambers, and the like. Further, according to the present invention, since the rubber membrane-like flexible member is provided in the bottom portion of the main chamber, various vibration isolating functions can be exhibited through the action (vibration) of the rubber membrane-like flexible member.

That is, when vibration having a specific frequency is inputted to the liquid in the main chamber through the intermediary of the insulator, the rubber membrane-like flexible member provided in the bottom portion of the main chamber is displaced (deformed) so as to avoid increasing the pressure of the liquid in the main chamber, and accordingly, a low dynamic spring constant (low dynamic spring characteristic) is obtained against the vibration having the above-mentioned frequency. With this arrangement, it is possible to aim at cutting off the so-called indistinguishable sound or the like which has conventionally been serious. In particular, according to the present invention, the above-mentioned rubber membrane-like flexible member is arranged, eccentric from the center point of a ring-like orifice by a predetermined degree, and accordingly, the area of the rubber membrane-like flexible member where the liquid in the main chamber applies a pressure (liquid pressure), that is, the pressure receiving area can be set to be broad within the main chamber. As a result, the liquid pressure absorbing ability of the rubber membrane-like flexible member can be enhanced, and further, the durability and the like of the flexible membrane-like member against repetitive deformation (displacement) caused by vibration can be enhanced. Further, in the negative pressure introduction type and liquid-scaling type vibration isolating apparatus, the area of the diaphragm formed of the rubber membrane-like flexible member can be increased, and accordingly, the durable strength of the rubber membrane-like diaphragm can be enhanced against repetitive deformation caused by expansion and contraction of the equilibrium chamber. Further, in addition to the above-mentioned matters, the value of induced force which is produced when negative pressure is introduced into the equilibrium chamber and which is transmitted to the liquid in the main chamber through the diaphragm can be obtained by a large degree.

According to another aspect of the present invention, a the liquid-sealing type vibration isolating apparatus comprises a main chamber made having a chamber wall made of vibration insulating rubber and having a large wall thickness, and an auxiliary chamber having a chamber wall formed of a rubber membrane. Further, a partition wall for partitioning the main chamber and the auxiliary chamber from each other, is formed of two panels mated end-to-end to each other, and is formed therein with a radially extending orifice communicating at one end with the main chamber and at the other with the auxiliary chamber. According to the present invention, in two panels constituting the partition wall, one of them is formed in its outer peripheral portion with an arcuate groove, and defines a space between itself and the other one of them, which serves as the orifice. Further, a through-hole as a communication hole communicating with the main chamber or the auxiliary chamber is formed in the wall surface with one of the panels on the one end side of the groove. The other end side of the groove is bent toward the center thereof. The other one of the panels, is formed in its center portion with a through-hole as a communication hole communicating with the main chamber or the auxiliary chamber, and being overlapped with the other end portion of the groove.

In the above-mentioned arrangement, the arcuate groove serving as an orifice has a through-hole at its one end, having a shape such that it curves toward the center, and is overlapped at its other end with a through-hole. That is, the other one of the panels has a simple shape such that a through-hole is formed at the center thereof, and accordingly, has no directional limitation. Thus, even though the two panels are assembled together in any combination, a passage length can be held to be constant. Accordingly, no positioning in the rotational direction is required during assembly thereof, and accordingly, the ease of assembling can be enhanced. Further, since the passage length is constant, the quality of the vibration isolating apparatus can be stabilized.

According to another aspect of the present invention, there is provided a liquid-sealing type vibration isolating apparatus comprising a main chamber having a chamber wall formed of an insulator made of a rubber elastic material and having a large wall thickness, an auxiliary chamber provided below the main chamber and having a wall chamber formed of a first diaphragm made of a rubber membrane and having a small wall thickness, and a partition wall partitioning between the main chamber and the auxiliary chamber, and formed in its outer peripheral portion with a first orifice communicating the main chamber and the auxiliary chamber with each other. A portion of the partitioning wall which faces the main chamber is formed with a movable member. The apparatus further includes a control means for moving the movable member in the partition wall. The insulator is joined at its outer peripheral portion with a cylindrical body fixture having its lower end portion extending downward and formed with a plurality of cut-out portions while the partition wall is formed at its outer peripheral portion with a plurality of protrusions corresponding the plurality of cut-out portions, and the partition wall is fitted and fixed in the body fixture so that the protrusions project from the cut-out portions. Further, one of the protrusion forms a tube-like shape so as to serve as a connection portion through which the control means is coupled to an external drive portion.

In the above-mentioned arrangement, whenever the plurality of protrusions including the tube-like protrusion are fitted in the plurality of the cut-out portions in the body fixture, the tube-like protrusion is exposed to the side portion of the device. Accordingly, the control means call be-simply coupled to the external drive portion through the tube-like protrusion. Since no seal is required, the manufacturing process of the liquid-sealing type vibration isolating apparatus can be simplified. Further, since the positioning of the partition wall can be easily made by fitting the cut-out portions onto the protrusions, it is possible to greatly enhance the workmanship for the assembly thereof.

In another arrangement, the partition wall is composed of a body portion, and a second diaphragm is joined to the upper surface of the body portion so as to define an equilibrium chamber serving as the control means between itself and the body portion. Since the equilibrium chamber is formed between the second diaphragm and the body portion so as to be used as the control means, air is introduced into the equilibrium chamber through the tube-like protrusion so as to displace the diaphragm for controlling the vibration-isolating property.

In another arrangement, the partition wall is composed of a body portion, and a movable panel is fixed to the upper surface of the body portion and can vertically move in a predetermined range. An actuator for operating the movable panel is provided in the body portion so as to constitute the control means, and lead wires for energizing the actuator are externally led out through the tube-like protrusion. Since the actuator can be energized through the above-mentioned wires, the movable panel is vibrated so as to control the pressure in the main chamber, thereby making it possible to control the vibration isolating property.

DETAILED DESCRIPTION OF THE PREFERRED EMBODIMENT

Figure 4:
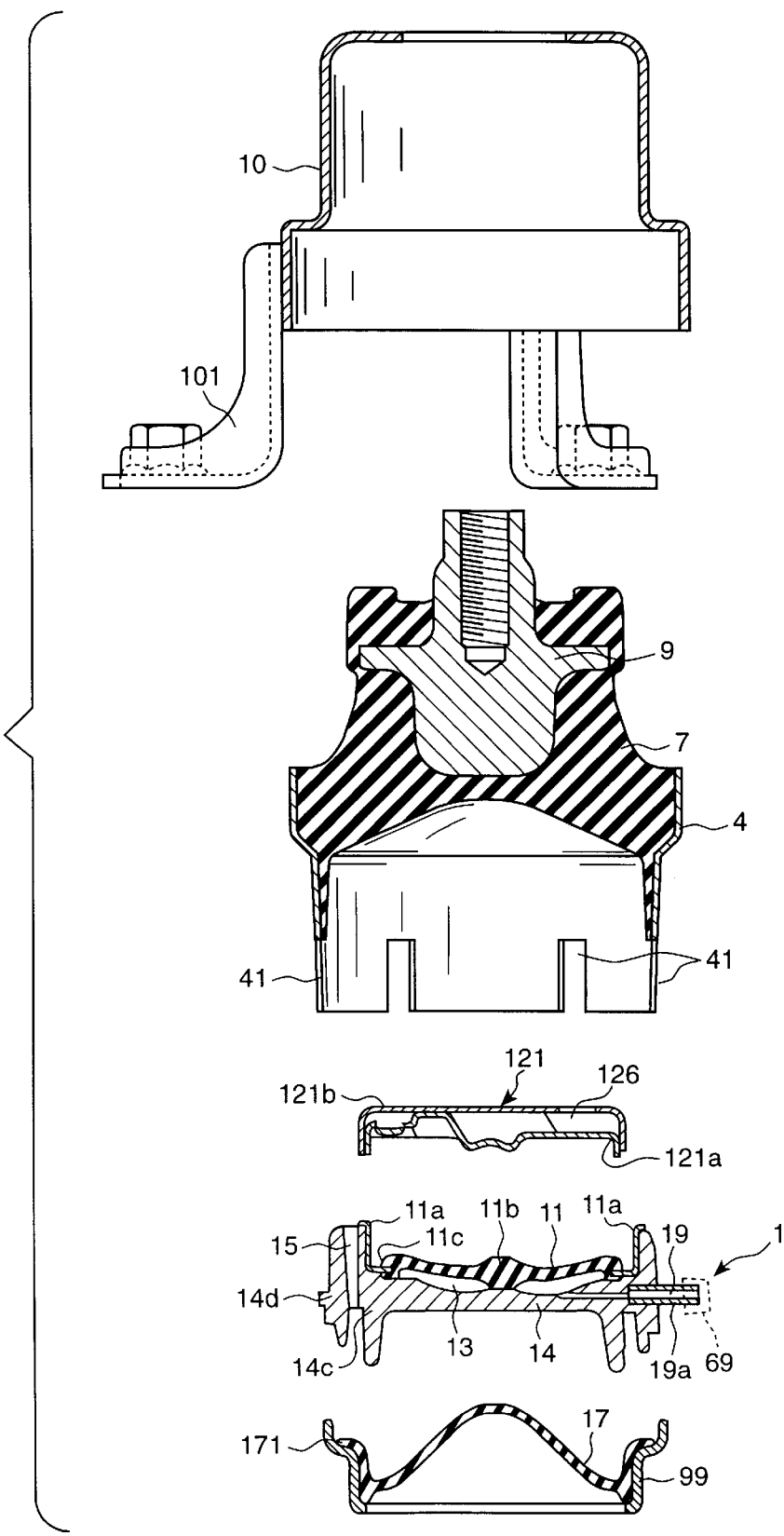
FIG. 4 is a view showing a final assembling step of a liquid-sealing type vibration isolating apparatus according to the present invention.

An embodiment of the present invention will be described in detail with reference to FIGS. 1 and 4 of the accompanying drawings. At first referring to FIG. 1, a vibration isolating apparatus has an upper coupling member 9 as a first coupling member adapted to be attached to a vibrator, a lower coupling member 99 as a second coupling member adapted to attached to a member or the like on the vehicle body side, an insulator 7 interposed between the upper and lower coupling members 9, 99, for absorbing and isolating vibration from the vibrator, a vibration isolating mechanism 1 arranged in series to the insulator and composed of liquid chambers such as a main chamber and an auxiliary chamber in which liquid as incompressive fluid is charged, an equilibrium chamber 13 forming a portion of the vibration isolating mechanism 1 and partitioned from a third liquid chamber 123 across a second diaphragm 11, a selector means 3 for carrying out change-over operation so as to alternately introduce negative pressure and the atmospheric pressure into the equilibrium chamber 13 in synchronization with vibration of the engine, a control means 5 for controlling the change-over operation of the selector means 3, a negative pressure tank 8 located between the selector means 3 and a negative pressure source utilizing intake negative pressure of an engine, and having a predetermined volume, and a check valve 40 provided on the negative pressure source side of the negative pressure tank 8, for preventing negative pressure from being relieved during a stop of the engine.

In the above-mentioned arrangement, the selector means is composed of a selector valve 31 such as three way valve, and a solenoid 32 for driving the selector valve 31. Further, in this arrangement, the solenoid 32 holds the selector valve 31 during a rest of an engine in a condition such that the selector valve 31 is opened to the atmosphere. That is, during a rest of the engine, that is, during non-operation of the vibration isolating mechanism 1, the selector valve 31 in the selector means 3 is operated so as to introduce the atmospheric pressure always into the equilibrium chamber 13 constituting the vibration isolating mechanism. As a result, during a rest of the engine, it is possible to avoid holding the second diaphragm 11 defining the equilibrium chamber 13, in a condition in which it is attracted, thereby making it possible to prevent fatigue or the like of the second diaphragm.

Figure 2:
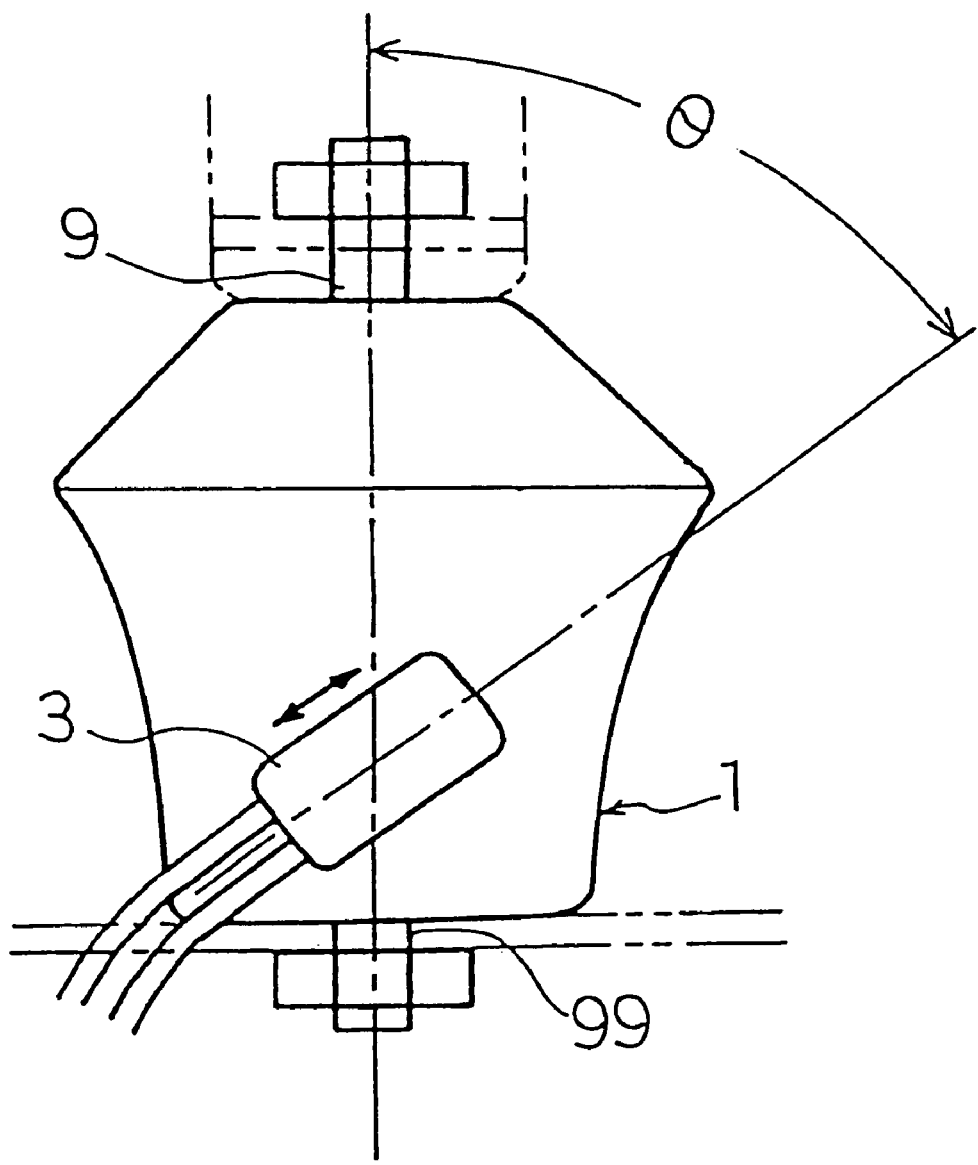
FIG. 2 is a front view of selector means in the isolator shown in FIG. 1, in an attached condition.

Further, the solenoid 32 constituting the solenoid means 3 having the above-mentioned arrangement, is attached at an inclined angle θ which is greater than 45 deg. with respect to the operating axis of the liquid-sealing type vibration isolating apparatus in the operating direction of the vibration isolating mechanism, as shown in FIG. 2. Accordingly, when the solenoid 32 of the selector means 3 is energized, the vibration thereof is cancelled with the operation (vibration) of the vibration isolating mechanism 1, and accordingly, the vibration of the solenoid 32 can be prevented from being transmitted to the vehicle body by way of the lower coupling member 99 and the like of the liquid-sealing type vibration isolating apparatus.

Figure 1:
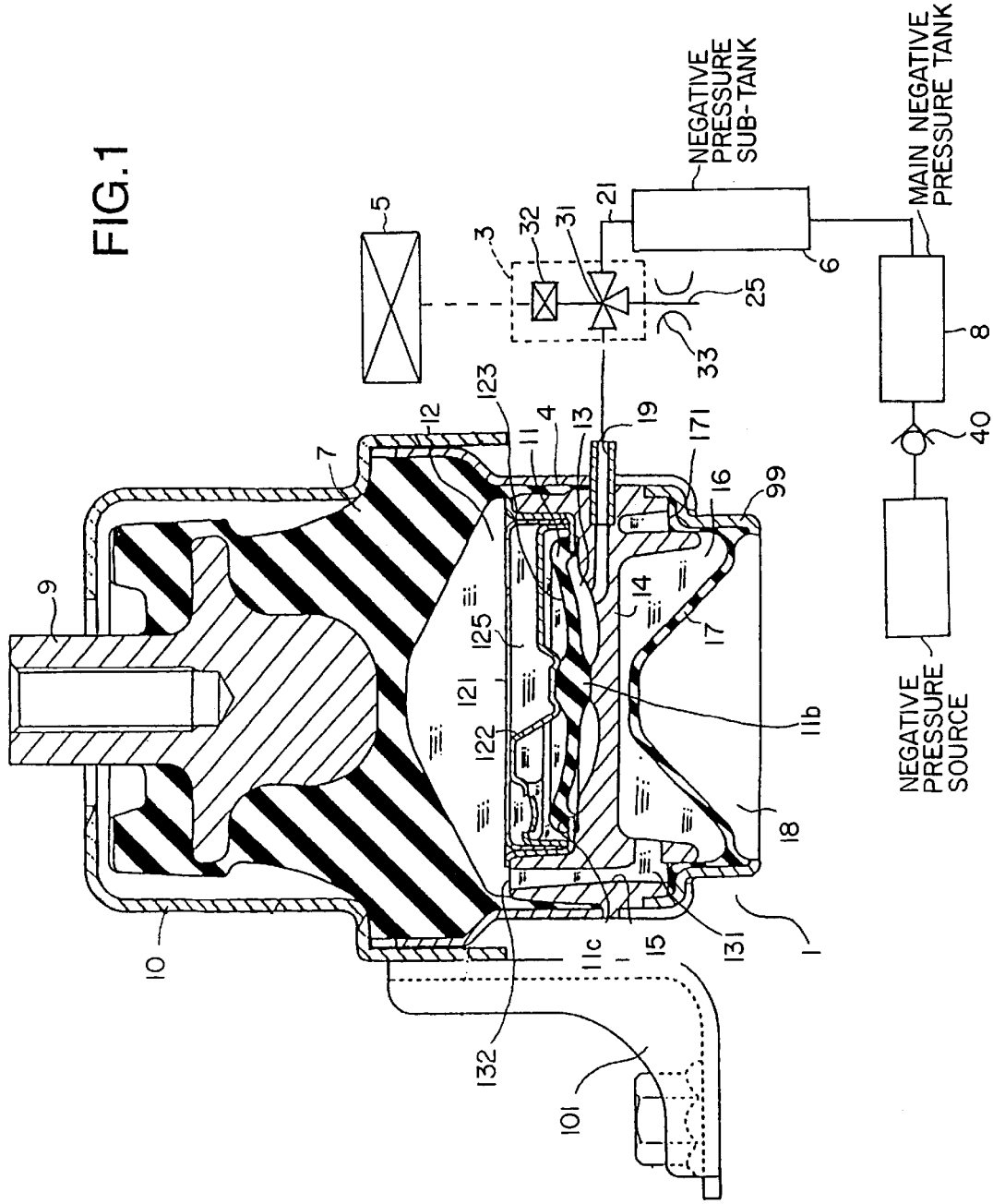
FIG. 1 is a longitudinal sectional view of the overall arrangement of a liquid-sealing type vibration isolating apparatus according to the present invention.

Further, a negative pressure sub-tank 6 having a predetermined volume is provided, as shown in FIG. 1, in the vicinity of the selector means 3 having the above-mentioned arrangement, in addition to the main negative pressure tank 8 adapted to supply negative pressure to into general negative pressure driven equipment. Further, in such a case that the distances from the negative pressure source using intake negative pressure of the engine and the main negative pressure tank 8 to the equilibrium chamber (that is, the pipe line distances) are long, the negative pressure sub-tank 6 can prevent the negative pressure from lowering caused by a resistance in the pipe line. Specifically, the volume of the negative pressure sub-tank 6 is equal to or greater than the sum of the volume of the equilibrium chamber 13 and the volume of the pipe line connecting between the equilibrium chamber 13 and the selector means 3. With the provision of this negative pressure sub-tank 6, negative pressure having a predetermined value can be surely fed into the equilibrium chamber 13 with a predetermined cycle, and accordingly, the second diaphragm 11 forming the equilibrium chamber 13 can be vibrated with a large amplitude. Accordingly, it is required to arrange a sub-negative pressure lank 6, near to the solenoid valve 31 constituting the selector means 3, as possible. Further, on the negative pressure source side of the main negative pressure tank 8 establishing a negative pressure system having the above-mentioned construction, a check valve 40 is provided as shown in FIG. 1. With this arrangement, even during a rest of the engine, negative pressure accumulated in the negative pressure system is prevented from returning into the air inlet side (intake side) of the engine. As a result, during engine operation, negative pressure is rapidly introduced into the equilibrium chamber 13 during operation of the engine in order to contribute to the isolation of idling vibration.

Next, the control means 5 for controlling the change-over operation of the selector means 3 having the above-mentioned arrangement, comprises a microcomputer or the like which is basically composed of a computing means such as a microprocessor unit (MPU), and is adapted to detect vibration from the vibrator such as an engine so as to control the change-over operation of the selector means.

Next, the vibration isolator for isolating various kinds of vibration including idling vibration by introducing a predetermined negative pressure or the like through the selector means 3 having the above-mentioned arrangement, and for supporting the vibrator such as an engine, is basically composed, as shown in FIG. 1, of the upper coupling member 9 attached to the vibrator, the lower coupling member 99 attached to the vehicle body side, the insulator 7 interposed between the upper and lower coupling members 9, 99 for absorbing and isolating vibration transmitted from-the vibrator such as an engine, and a vibration isolating mechanism 1 arranged in series to the insulator 7 and composed of the main chamber 12 in which liquid as incompressive fluid is charged, an auxiliary chamber 16 connected to this main chamber 12 through the intermediary of a first orifice 15, and having a chamber wall a portion of which is formed by a first diaphragm 17, and an air chamber 18 partitioned from the auxiliary chamber 16 across the first diaphragm 17, and the equilibrium chamber 13 partitioned from the main chamber 12 across another diaphragm (second diaphragm) 11

It is noted that the insulator 7 is made of vibration-isolating rubber material and is integrally incorporated with the upper coupling member 9 through a vulcanizing and bonding means or the like. In the lower portion of the insulator having the above-mentioned arrangement, the main chamber 12 has its wall chamber formed from a portion of the insulator 7. Further, the portion below the main chamber 12 is formed therein with the equilibrium chamber 13 into which negative pressure and the atmospheric pressure are alternately introduced. It is noted that between the equilibrium chamber 13 having the above-mentioned arrangement and the main chamber 12, there is provided a liquid resonance mechanism including the second diaphragm 11, the second orifice 125 and the third liquid chamber 123. Accordingly, pressure variation transmitted to the equilibrium chamber 13 is transmitted to the liquid in the main chamber 12 through the vibration of the second diaphragm 11, vibration of liquid in the third liquid chamber 123 and resonance of liquid through the second orifice 125. As a result, the pressure variation transmitted to the liquid in the main chamber 12 is adjusted so as to have a substantially sinusoidal wave pattern.

Next, the operation of this embodiment constituted as mentioned above will be explained. At first, vibration from the vibrator is transmitted to the insulator 7 made of a rubber material or the like, through the intermediary of the upper coupling member 9. A substantial portion of the vibration transmitted to the insulator 7 is absorbed and isolated through deformation or the like of the insulator 7 itself. However, one of the vibrations cannot be isolated through the insulator 7, but is isolated by the vibration isolating mechanism 1 including the equilibrium chamber 13, arranged next to the insulator 7. Specific operation of this mechanism will be explained later. That is, when idling vibration is inputted, the selector means 3 is operated so as to alternately introduce negative pressure and the atmospheric pressure into the equilibrium chamber 13. That is, the selector means 3 is operated at a predetermined frequency so as to change the pressure (volume) in the equilibrium chamber 13, and accordingly, the pressure variation of the liquid in the main chamber 12, which is caused by idling vibration inputted through the insulator 7, can be absorbed. As a result, the dynamic spring constant of the spring system composed of the insulator 7 and the vibration isolating mechanism can be reduced.

Further, in this case, in the above-mentioned embodiment, the third liquid chamber 123 is subjected to variation caused by the operation of another diaphragm, that is, the second diaphragm 11 defining the equilibrium chamber 13, is connected to the main chamber 12 through another orifice, that is, the second orifice 125 having a predetermined volume. The liquid in the second orifice resonates with the pressure variation in the liquid in the main chamber 12 through the operation of the second diaphragm 11. Accordingly, the variation of a force (vibrating energy) induced by the overall vibration isolating mechanism 1 has a substantially ideal sinusoidal pattern. Thus, it is possible to safely absorb and isolate idling vibration.

Further, when vibration relating to engine shake which is serious during running of a vehicle, is inputted, the selector means 3 is operated so as to continuously introduce negative pressure having a constant value, into the equilibrium chamber 13 constituting the vibration isolating mechanism 1, and accordingly, the second diaphragm 11 defining the equilibrium chamber 13 is pulled downward in order to set the volume of the equilibrium chamber to zero. Thus, the third liquid chamber 123 communicated with the main chamber 12 is prevented from changing its volume. In this condition, when the vibration is transmitted from the vibrator to the insulator 7, the lower surface portion of the insulator 7 vibrates in association with this vibration so as to positively cause the liquid to flow from the main chamber 12 into the auxiliary chamber 16. As a result, the liquid flows from the main chamber 12 to the auxiliary chamber 16 by way of the first orifice 15 through which there is induced a viscous resistance which produces a predetermined damping 10 force restraining (damping) the engine shake.

Further, in this embodiment exhibiting the above-mentioned technical effects and advantages, the negative pressure sub-tank 6 having a predetermined volume is provided between the negative pressure source utilizing intake negative pressure of the engine, and the selector means 3, in addition to the main negative pressure tank 8 which serves to stably supply negative pressure into other negative pressure driven equipments. Further, since the check valve 40 is provided on the negative pressure source side of the main negative pressure tank 8, negative pressure which is always stable is introduced into the equilibrium chamber 13. Accordingly, even with this arrangement, energy generated by the vibration isolating mechanism 1 can be maintained at a high value.

Further, the negative pressure sub-tank 6 is located as near as possible to the selector means 3, and accordingly, the value of negative pressure introduced into the equilibrium chamber 13 can be maintained at a value nearly equal to the value of intake negative pressure of the engine. In general, long negative pressure hoses are laid between the negative pressure source using intake negative pressure of the engine, and the main negative pressure tank 8, the selector means 3, and the equilibrium chamber 13 by way of the selector means 3. Accordingly, these negative pressure hoses exhibit a fluid resistance so that negative pressure having a value lower than that of the intake negative pressure of the engine is likely to be introduced into the equilibrium chamber 13. However, in this embodiment, the negative pressure sub-tank 6 having a predetermined volume is provided in the vicinity of the selector means 3, and the check value 4 for preventing the atmospheric air from being introduced into the negative pressure source side even during a rest of the engine, is provided on the negative pressure source side of the negative pressure system constituted by the sub-negative pressure tank 6 and the like, negative pressure having a high degree which is always maintained at a predetermined value is introduced into the equilibrium chamber 13. Thus, the second diaphragm defining the equilibrium chamber 13 can always produce high energy.

Further, the actuating direction of the solenoid 32 constituting the selector means 3 is set to an inclined angle of greater than 45 deg. with respect to the operating axis of the liquid-sealing type vibration isolating apparatus. Accordingly, the actuating direction of the solenoid 32 constituting the selector means 3, that is, the vibrating direction, is aligned with the vibrating direction of the vibration isolating mechanism 1 in the vibration isolating apparatus. As a result, the vibration energy of the selector valve 3 caused by the operation of the solenoid 32 can be cancelled with the vibration energy of the vibration isolating mechanism 1. Accordingly, the vibration of the selector valve can be prevented from being transmitted to the vehicle body side by way of the member for attaching the vibration isolator or the like. As a result, the attachment of the selector means 3 to the liquid-sealing type vibration isolating apparatus can eliminate the necessity of interposing a vibration isolating rubber element or the therebeteween, and accordingly, the selector means can be directly attached to the vibration isolating apparatus with the use of a metal bracket or the like.

With the above-mentioned construction, it is possible to prevent the diaphragm (second diaphragm) defining the equilibrium chamber from being left to be attracted during a rest of the engine. As a result, it is possible to prevent fatigue of the diaphragm and attraction thereof toward the bottom surface portion of the equilibrium chamber.

Further, since the negative pressure sub-tank is located as near as possible to the selector means 3, and since the volume thereof has a value which is greater than the sum of the volume of the equilibrium chamber and the volume of the passage connecting between the equilibrium chamber and the selector means, it is possible to prevent the value of negative pressure from decreasing due to a long passage from the negative pressure source. As a result, negative pressure having a high value can be always introduced into the equilibrium chamber, thereby making it possible to ensure sufficient energy in the vibration isolating mechanism. Thus, it is possible to efficiently isolate the idling vibration.

Further, since the actuating direction of the solenoid constituting the selector means is set to an inclined angle of greater than 45 deg. with respect to the principal axis or the operating direction of the liquid-sealing type isolating apparatus, the vibration energy caused by the operation of the solenoid can be cancelled out with the operating energy of the liquid-sealing type vibration isolating apparatus. As a result, it is possible to attach the selector means to the liquid-sealing type vibration isolating apparatus with the use of simple measures, thereby making it possible to reduce the number of required components.

Next, explanation will be made of the vibration isolating mechanism 1 in detail with reference to FIGS. 1 to 4. Referring to first FIG. 1, the insulator 7 which is formed of a rubber elastic member having a large wall thickness, defines in its hollow lower half portion the main chamber 12. The insulator 7 formed of the rubber elastic member has a lower end opening and a partition wall for closing the lower end opening. The first diaphragm 17 formed of a rubber membrane having a small wall thickness is arranged therebelow. A space surrounded by the partition wall 14 and the diaphragm formed of the rubber membrane is the auxiliary chamber 16.

A cylindrical body fixture 4 is joined to the outer periphery of the lower half portion of the insulator 7. The insulator 7 has a lower end edge extending downward along the outer peripheries of the partition wall 14 and the first diaphragm 17, and is then inwardly bent so as to hold them. The upper coupling member 9 is embedded and fixed in the upper portion of the insulator 7, and accordingly, the insulator 7 is coupled to the engine through the intermediary of the upper coupling member 9. A cap 10 is fitted on the upper half portion of the insulator 7 which is therefore secured to the vehicle body through the intermediary of a plurality of leg portions 10 formed in the side portion of the cap 10.

The partition wall 14 is composed of a container-like body portion formed of an aluminum casting or an integral resin molding, the second diaphragm 11 formed of an elastic membrane and held in the body portion, and a partition panel 121. The body portion of the partition wall 14 has an outer peripheral surface portion having a large wall thickness and formed therein with an arcuate groove 131 opened downward, and is formed with the first orifice 15 (refer to FIG. 1) between itself and the outer peripheral portion 171 of the first diaphragm 17 arranged therebelow. It is noted here that the outer peripheral portion 171 of the first diaphragm 171 is joined thereto with a cylindrical reinforcing member, having its upper end portion which is flange-like so as to extend along the bottom portion of the groove 131.

The body portion of the partition wall 14 is formed therein with a communication hole 132 communicating the first orifice 15 with the main chamber 12, and has a communication hole which is not shown and which communicates the first orifice 15 with the auxiliary chamber 15. Further, by allowing liquid to flow between the main chamber 12 and the auxiliary chamber 16 through the orifice 15, thereby making it possible to reduce vibration in a predetermined frequency range which is set in accordance with a passage diameter and a passage length, such as vibration caused by engine shake.

The second diaphragm 11 made of an elastic material member made of rubber or the like, has a wall thickness which is slightly greater than that of the diaphragm 17. A cylindrical metal member is fixed to the outer periphery of the second diaphragm 11, and is fitted and fixed to the body portion of the partition wall 14 by a metal member 11a. The upper end edge of the metal member 11a is outward bent so as to abut against the upper surface of the body portion of the partition wall 14. A space defined between the second diaphragm 11 and the body portion of the partition wall 14 serves as the equilibrium chamber 13 into which negative pressure is introduced through a negative pressure passage 19 formed in the body portion of the partition wall 14 so as to attract the second diaphragm 11 downward.

The negative pressure passage 19 is communicated with a negative pressure pipe 19a having been press-fitted so as to project from the side portion of the body portion of the partition wall 14. The negative pressure pipe 19a communicates with a negative pressure passage in the engine so as to introduce negative pressure into the equilibrium chamber therethrough. It is noted that body fixture 4 is formed in its lower end portion to which the insulator 7 is not joined, with cut-out portions 41 at several circumferential positions, and the negative pressure pipe 19 is arranged, corresponding to one of the cut-out portions 41 of the body fixture 4. A plurality of protrusions 14d formed on the side portion of the body portion of the partition wall 14 correspond respectively to the cut-out portions 41 of the body fixture 4, except the above-mentioned one, thereby making it possible to facilitate the positioning thereof during assembly.

The partition panel 121 is formed in its outer peripheral portion with an annular space serving as a second orifice 126, and at its lower peripheral edge with a flange 121a projecting downward so as to be fitted and held in the metal member 11a. With this arrangement, the third liquid chamber 123 is defined between the partition panel 121 and the second diaphragm 11 (refer to FIG. 1). The second orifice 126 has a passage diameter or a passage length which is larger or longer that that of the first orifice 15 and is adjusted to absorb vibration having a frequency which is higher than that can be absorbed by the first orifice, such as idling vibration. The second orifice 126 communicates with the main chamber 12 through the communication hole 132 and also communicates with the auxiliary chamber through the communication hole which is not shown.

The second diaphragm 11 is formed in its center portion with a convex portion 11b projecting from the upper and lower surfaces thereof. The convex portion 11b has opposite end surfaces which are made in close contact with the upper surface of the partition wall 14 and the lower surface of the partition panel 12 (refer to FIG. 1). Further, the second diaphragm 11 is formed with an upright wall 11c projecting downward from the outer peripheral edge of the second diaphragm 11. An annular bead portion 14c is formed on the outer peripheral portion of the body portion of the partition wall 14. The upper surface of this annular bead portion 14c is made into close contact with the lower end face of the upright wall 11c. With the provision of the convex portion 11b and the annular bead portion 14c, a space can be easily defined between the first diaphragm 11 and the partition wall 14. The upright wall tic can reinforce the second diaphragm 11, and as well facilitate the definition of the space between the second diaphragm 11 and the body portion of the partition wall 14.

Figure 3:
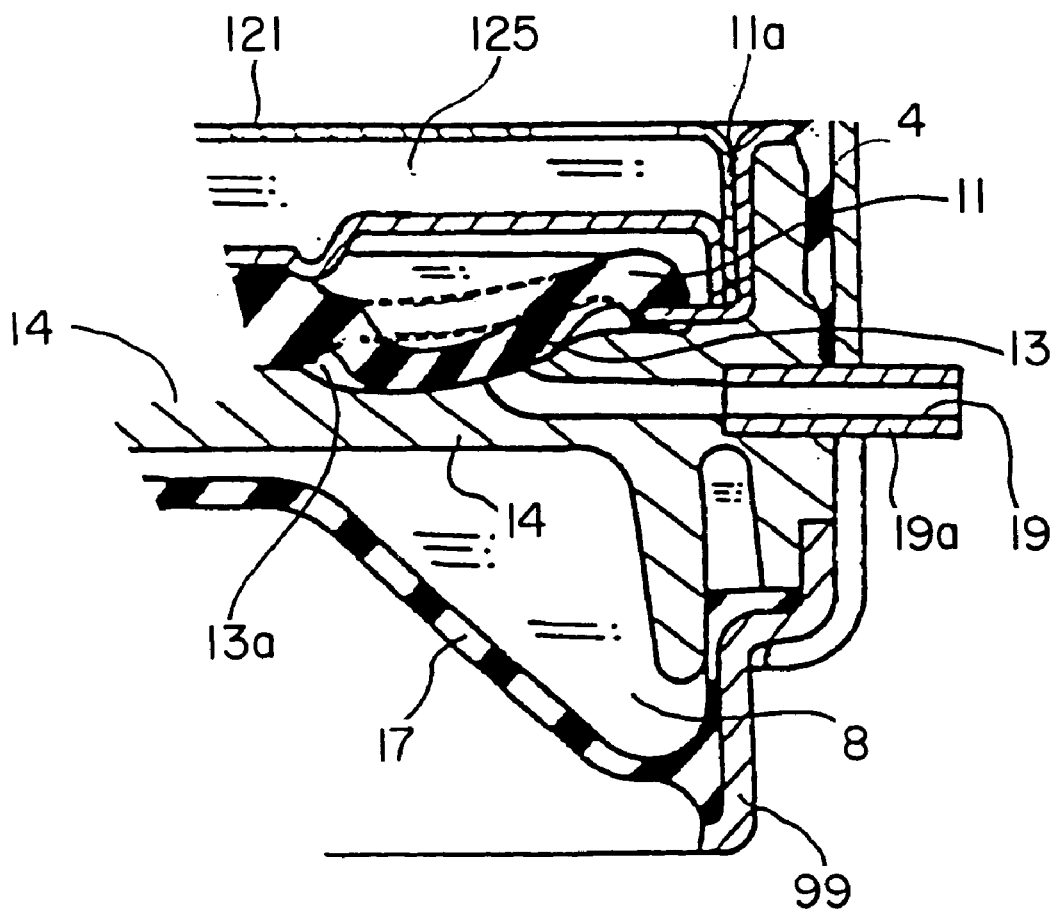
FIG. 3 is an enlarged partially sectioned view of a liquid-sealing type vibration isolating apparatus according to the present invention.

With this arrangement, when negative pressure is introduced into the equilibrium chamber 13, the second diaphragm is attracted downward as shown in FIG. 3. It is noted that the second diaphragm 11 and the body portion of the partition wall 14 are not made into fully close contact with each other so as to remain small spaces 13a around the convex portion 11b of the center portion, and between the annular bead portion 14c and the upright wall tic. Accordingly, parts of the second diaphragm facing these small spaces 13a can be displaced by a small degree. Thus, by suitably setting the rigidity of the second diaphragm 11 during operation under negative pressure and the volumes of the small spaces 13a, indistinguishable sound vibration can be effectively absorbed. Normally, it is preferable to set the contact area between the second diaphragm 11 and the body portion of the partition wall 14 under negative pressure in a range of −200 to −500 mmHg which can be obtained during running of a vehicle, to 40 to 95% of the movable area during operation under the atmospheric air (indicated by the dotted line in FIG. 3). Further, at this time, the free deformation of the second diaphragm is limited, and accordingly, when engine shake vibration is inputted, the liquid flows into the auxiliary chamber 16 which can easily deform, so as to damp the vibration.

Figure 5:
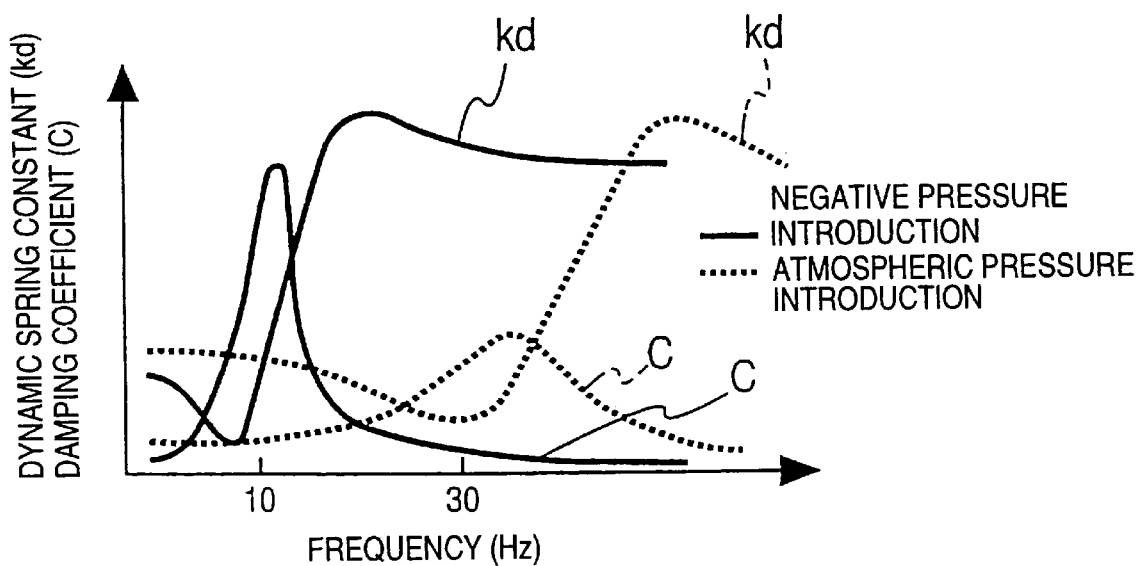
FIG. 5 is a view showing a frequency characteristic of a conventional liquid-sealing type vibration isolating apparatus.

The above-mentioned facts will be discussed in detail with reference to the frequency characteristics shown in FIGS. 5 and 6. FIG. 5 shows the characteristic in the case in which the second diaphragm 11 and the body portion of the partition wall 14 do not have a convex portion and a bear portion. Since no small space is present in the equilibrium chamber 13 during operation under negative pressure, and accordingly, the second diaphragm serves as a rigid body. In this case, as indicated by the solid line, a high damping coefficient can be obtained due to the action of liquid flowing through the first orifice 215 around about 10 Hz corresponding, to engine shake vibration, but, due to this fact, the dynamic spring constant is high on the high frequency side so that no vibration damping effect can be obtained. The dotted line in this figure indicates the frequency characteristic when the equilibrium chamber 13 communicates with the atmospheric air. The liquid can thus flow into the third liquid chamber 123 due to the free deformation of the second diaphragm 11. Further, due to the action of the liquid flowing through the second orifice 126, the dynamic spring constant is lowered, but due to this fact, the dynamic spring constant becomes high on the high frequency side. Accordingly, no vibration damping effect can be obtained.

Figure 6:
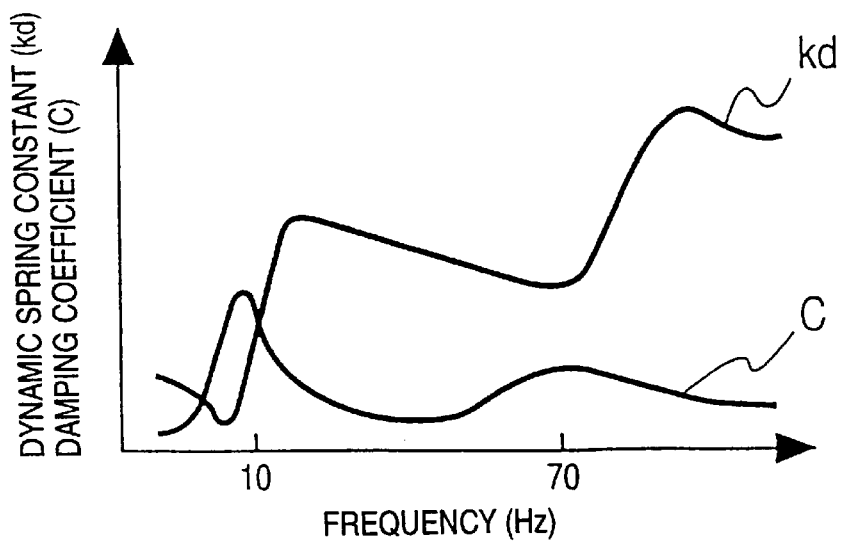
FIG. 6 is a view showing a frequency characteristic of a liquid-sealing type vibration isolating apparatus according to the present invention.

FIG. 6 shows a frequency characteristic in the case in which the second diaphragm 11 and the body portion of the partition wall 14 are provided with convex portion 11b, the bead portion 14e, and the upright wall 11c, according to the present invention. With this arrangement, when negative pressure is introduced, since the second diaphragm 11 has a sufficiently high degree of rigidity, and since the inflow of the liquid into the third liquid chamber 123 is limited, when engine shake vibration around 10 Hz is inputted, a satisfactory damping effect can be obtained due to the action of the liquid flowing through the first orifice 15. Further, around 60 to 80 Hz corresponding to indistinguishable sound, the second diaphragm can be displaced by a small degree due to the provision of the small space 13a defined between the second diaphragm 11 and the body portion of the partition wall 14, and accordingly, an increase in the internal pressure of the main chamber 12 can be absorbed, so as to lower the dynamic spring constant in order to damp the vibration. When idling vibration is inputted, by introducing the atmospheric air into the equilibrium chamber 13, the dynamic spring constant can be lowered, as shown in FIG. 5 (indicated by the dotted line), thereby making it possible to damp the vibration.

Thus, the above-mentioned arrangement which is simple, can exhibit a satisfactory damping characteristic, and accordingly, is highly practical. It is noted that the number of convex portions, the positions thereof and the like should not limited to those explained in the above-mentioned embodiment, but can be suitably changed.

It is noted that the negative pressure introduction type fluid-sealing type vibration isolating apparatus according to the present invention is basically manufactured through two separate assembling process, that is, a process of assembling the vibration exciting mechanism including the equilibrium chamber 13 and a process of assembling the overall isolator. Explanation of these processes will be provided below.

Of these basic processes, at first, the process of assembling the vibration exciting mechanism having the equilibrium chamber 13 will be explained with reference to FIG. 4. First, liquid which has been prepared so as to prevent deposition of solid components after evaporation, such as liquid composed of water and ethylene glycol, is filled in a container. Then, the vibration exciting second diaphragm 11 adapted to define the equilibrium chamber 13, and the partition wall 14 adapted to define the equilibrium chamber 13 and having a passage which serves to introduce gas under negative pressure or the like into the equilibrium chamber 13, are integrally incorporated (assembled) with each other in this liquid. Accordingly, the vibration exciting mechanism having therein the equilibrium chamber 13, as shown in FIG. 3, has been assembled. Further, the negative pressure passage 19 communicating with the equilibrium chamber 13 formed in the thus assembled vibration isolating mechanism is sealingly closed by a cap 69. It is noted that the liquid having been introduced in the equilibrium chamber 13 may be discharged before the passage is sealingly closed.

Next, the thus assembled vibration exciting mechanism, the vibration isolating mechanism including the insulator 7, the partition pare 21 serving as an adjustable orifice, the first diaphragm 17, the lower coupling member 99 and the like, are integrally incorporated with each other in a container filled therein with liquid which will be enclosed in the liquid chambers. That is, the liquid which has been used during the assembly of the vibration exciting mechanism and in which a predetermined rust preventines is added, or the liquid which is prepared, as a base, so as to prevent deposition of a solid component after evaporation, and in which a predetermined rust preventives is added. Accordingly, even though liquid having stuck to the vibration exciting mechanism during the assembly of the latter, is mingled into the container in which the assembly of the overall isolator is carried out, no detrimental effect occurs in the liquid which will be enclosed in the liquid chambers during and after the assembly of the isolator. Thus, the liquid-sealing type vibration isolating apparatus having therein the equilibrium chamber 13 is formed (assembled). Further, in a condition in which the liquid-sealing type vibration isolating apparatus has been thus assembled, liquid is discharged from the equilibrium chamber 13 and the negative pressure passage 19, and then moisture is completely expelled from the equilibrium chamber 13 and the negative pressure passage.

Functions and the like of the liquid-sealing type vibration isolating apparatus in this embodiment, assembled in the above-mentioned process, will be explained. At first, since the vibration exciting mechanism having the equilibrium chamber in which gas is introduced, is assembled in the liquid which can prevent deposition of solid components after evaporation, and since the assembly of the overall isolator is carried out in such a closely sealed condition that a liquid containing the rust preventines cannot enter into the equilibrium chamber 13, no deposit such as the rust preventines is present in the equilibrium chamber. Accordingly, it is possible to prevent hindering the operation of the selector valve (which is not shown). As a result, the assembly of the liquid-sealing type vibration isolating apparatus can be completed after discharging the liquid from the equilibrium chamber, and then removing moisture. Thereby, it is possible to enhance the efficiency of the assembly of the isolator. Since the whole process including the process of assembling the vibration exciting mechanism is carried out in the liquid, there is no risk of trapping air in gaps between components assembled together, and it is possible to eliminate the problem of the mingling of air or the like into the liquid. As a result, it is possible to prevent the dynamic spring constant from being changed due to air which has been mingled into the main chamber 12 and the auxiliary chamber 16 during use. Thereby making it possible to prevent maintain a stable vibration isolating characteristic.

According to the present invention, the negative pressure introduction type liquid-sealing type vibration isolating apparatus including the vibration exciting mechanism having the equilibrium chamber or the like into which negative pressure or the atmospheric pressure is introduced, is carried out in such a way that the vibration exciting mechanism is assembled in the liquid which has been prepared so as to prevent deposition of solid components after evaporation, and the final assembly of several components including the Is vibration exciting mechanism is carried out in another liquid containing the rust preventines or the like. Accordingly, it is possible to eliminate the presence of a powder-like substance which is possibly produced by deposition of solid components, such as the rust preventives, in the equilibrium chamber. As a result, it is possible to ensure the operational stability around the selector valve during operation of the vibration isolating apparatus according to the present invention.

Further, since the assembly of the isolator can be carried out in the liquid, no air is trapped in gaps between the components assembled together, and accordingly, such air can be prevented from mingling into the liquid during use. Even though it is used for a long time, it is possible to stabilize the dynamic spring constant, that is, to stabilize the vibration characteristic.

Next, explanation will be made of examples of application of the liquid-sealing type vibration isolating apparatus having the above-mentioned arrangement with reference to FIGS. 7 to 11B. The arrangement relating to this embodiment is basically composed of, as shown in FIG. 7, liquid-sealing type vibration isolating units 1A, 1B arranged in pair in front and rear of, or on the left and right sides of a vibrator 44 such as an engine, a single selector means 3 adapted to carry out change-over operation for continuously introducing negative pressure or the atmospheric pressure respectively into the pair of vibration isolating units 1A, 1B, or alternately introducing the negative pressure and the atmospheric pressure thereinto in synchronization with idling vibration of the engine, passages 2, 2' composed of hoses or the like, for supplying the negative pressure or the atmospheric pressure which are suitably changed over by the selector means 3, a control means 5 for controlling the change-over operation of the selector means.

Figure 8:
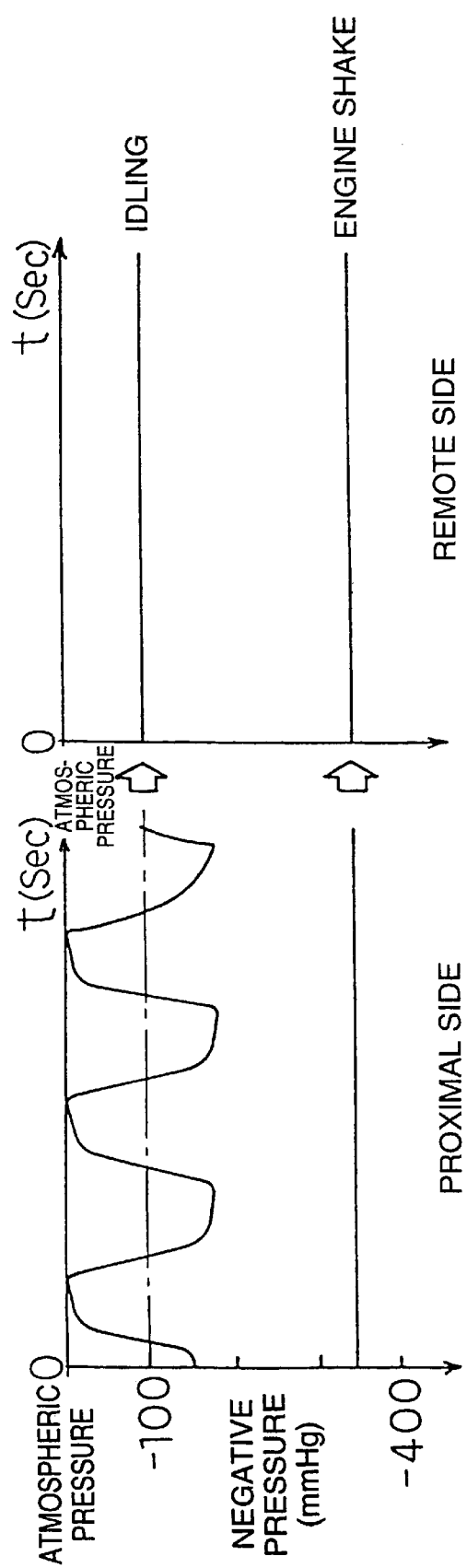
FIG. 8 is a view of a liquid-sealing type vibration isolating unit according to the present invention, in an operating condition.

In this basic arrangement, the selector means is composed of a selector valve 31 such as a three-way selector valve as shown in FIG. 1 and 8, and a solenoid 32. Further, the atmospheric pressure introduction port side of the selector valve having the above-mentioned arrangement, is provided with a restrictor valve for adjustment to balance the introduction flow rate of the atmospheric pressure with introduction flow rate of negative pressure. Further, the negative pressure introduction port side thereof is provided with a resonance tank 35 having a predetermined volume. With the provision of such a resonance tank 35, even though the distance (pipe line length) between the negative pressure source using intake negative pressure of the engine or the like, and the equilibrium chamber 13 becomes long, it is possible to prevent the degree of negative pressure from being lowered by the resistance of the pipe line or the like. That is, with the provision of the resonance tank 35, a predetermined degree of negative pressure can be precisely fed into the equilibrium chamber 13 with a predetermined cycle, and accordingly, it is possible to vibrate the second diaphragm 22 defining the equilibrium chamber 13, with a large amplitude.

Figure 7:
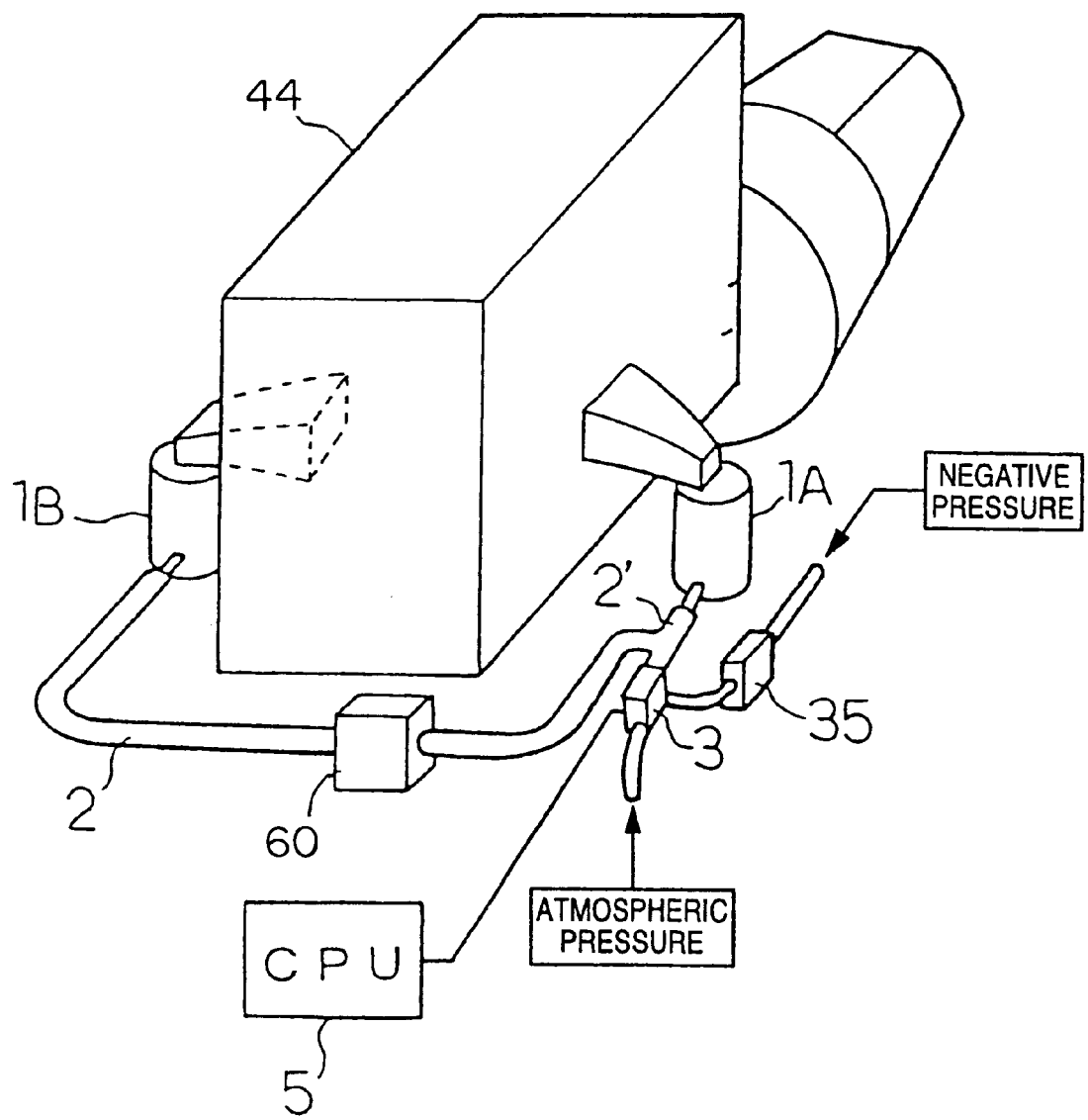
FIG. 7 is a perspective view of the overall arrangement of a liquid-sealing type vibration isolating apparatus according to the present invention.
Figure 11A:
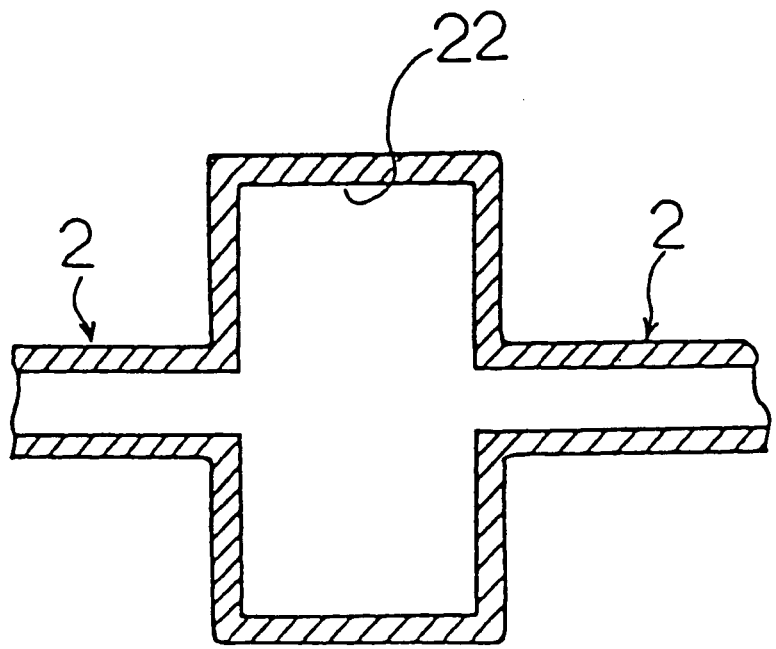
FIGS. 11A and 11B are longitudinal sectional views of a passage in a liquid-sealing type vibration isolating apparatus according to the present invention, and a variant form thereof.
Figure 11B:
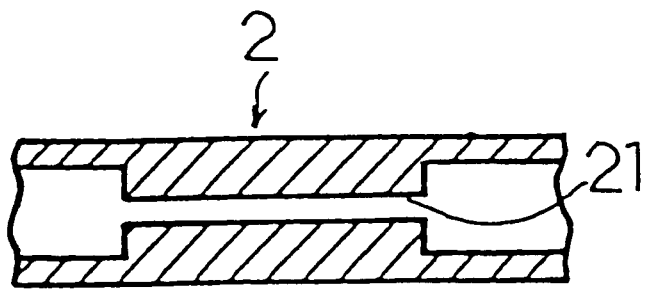

Further, the negative pressure passages 2, 2, connecting between the selector means 3 and the vibration isolating units 1A, 1B mounted to the above-mentioned vibrator 44, are pipe lines composed of hoses or the like, as shown in FIGS. 7, 11A and 11B. However, the structure of the passage 2' connected to the vibration isolating unit 1A in the vicinity of the selector means 3 is different from that of the passage 2 connected to the vibration isolating unit 1B remote from the selector means 3. That is, the passage 2' connected to the vibration isolating unit 1A has a larger diameter, so that pressure variation in synchronization with vibration (frequency) of the engine can be normally transmitted from the selector means 3. On the other hand, the passage connected to the remote side vibration isolating unit 1B has a constriction 21 in its portion, or an expansion chamber 22 having a predetermined volume in the intermediate portion thereof, as shown in FIG. 11A. That is, the passage 2 connected to the remote side vibration isolating unit 1B, has a high impedance. Accordingly, negative pressure or the like can be introduced into the equilibrium chamber 13 in the vibration isolating unit located on the remote side in a leveled state.

Further, the control means 3 for controlling the change-over operation of the selector means 3 for suitably changing over negative pressure having a predetermined degree or the like and feeding into the passages 2, 2' having the above-mentioned structures, is composed of a microcomputer or the like composed of a computing means such as a microprocessor unit (MPU), which detects vibration from the vibrator such as the engine and control the change-over operation of the selector means in accordance with the detected vibration.

Next, each of the vibration isolating units 1A, 1B into which a predetermined degree of negative pressure is introduced through the selector means 3 and the passages 2, 2', consists of the liquid-sealing vibration isolating apparatus (liquid-sealing type vibration isolating unit) as show in FIG. 1. A pair of liquid-sealing type vibration isolating units are attached respectively to the opposite sides of the vibrator 44 such as the engine, so as to constitute the vibration isolating system. Specific arrangement of the vibration isolating unit 1 will be explained in detail. That is, the vibration isolating unit 1 is basically composed of an upper coupling member 9 attached to the vibrator 44, a lower coupling member 99 attached to the vehicle body side, an insulator 7 interposed between the upper and lower coupling members 9, 99, for absorbing vibration, a main chamber 12 connected in series to the insulator and filled therein with liquid such as non-compressive fluid, a subchamber 6 which is coupled to the main chamber 12 communicated with the main chamber 12 through a second orifice 125, and having a chamber wall a portion of which is defined by a first diaphragm 17, an air chamber 18 partitioned from the auxiliary chamber 16 across the diaphragm 17, and an equilibrium chamber 13 partitioned from the main chamber 12 across another diaphragm 15.

It is noted that in the above-mentioned basic component, the insulator 7 is made of vibration isolating rubber materials, and integrally bound to the upper coupling member 9 through vulcanizing and bonding measures. Further, the insulator 7 thus constructed defines in its lower portion the main chamber 2 having a wall chamber formed by a portion of the insulator 7. Further, such a main chamber 12 defines in the lower portion or the like thereof the equilibrium chamber 13 into which negative pressure and the atmospheric pressure are alternately introduced.

Next, explanation will be made of the operation of this embodiment having the above-mentioned arrangement. Vibration from the vibrator 44 is transmitted to the insulator made of a rubber material by way of the upper coupling member 9, as shown in FIG. 1. The substantial portion of the vibration transmitted to the insulator 7 is absorbed or isolated through deformation of the insulator 7. However, a portion of the vibration which cannot be absorbed or isolated by the insulator 7 is isolated by the vibration isolating mechanism including the equilibrium chamber 13. This specific operation will be explained below. When idling vibration is inputted, the selector means 3 is operated, and accordingly, negative pressure and the atmospheric pressure are alternately introduced into the liquid-sealing type vibration isolating unit 1 at a specific frequency. Through this operation, the negative pressure and the atmospheric pressure are alternately introduced into the equilibrium chamber 13 in the liquid-sealing type vibration isolating unit 1A provided in the vicinity of the selector means 3 (refer to FIG. 8). As a result, the pressure (volume) in the equilibrium chamber 13 varies so as to absorb variation in pressure of liquid in the main chamber 12 caused by the idling vibration inputted through the insulator 7. Accordingly, the dynamic spring constant of a spring system composed of the proximal side vibration insulating unit 1A can be lowered.

Meanwhile, negative pressure and the atmospheric pressure introduced into the equilibrium chamber 13 arranged remotely from the selector means 3, through the selector means 3 has a substantially averaged value, as shown in FIG. 8, without being changed over as those introduced into the proximal side vibration isolating unit 1A since they are introduced into the equilibrium chamber 13 through the negative pressure passage 2 having a high impedance. As a result, the remote side equilibrium chamber 13 is held in a condition in which the negative pressure has a constant value nearly equal to the atmospheric pressure, and accordingly, the second diaphragm 11 defining the equilibrium chamber 13 is set in a condition in which it can easily vibrate freely. In this condition, when the idling vibration is transmitted to the main chamber 12 constituting the vibration isolating unit 1B, the liquid in the main chamber 12 is subjected to a pressure variation which is then transmitted to the second diaphragm 11 defining the equilibrium chamber 13. Since the second diaphragm 11 can easily vibrate freely at this time, the second diaphragm 11 freely vibrates in response to the inputted idling vibration so as to absorb the pressure variation of the liquid in the main chamber 12. As a result, when the idling vibration is inputted, the pressure of the liquid in the main chamber 12 is not increased, and accordingly, the spring constant of the spring system constituted by the vibration isolating unit 1B in its entirety is not increased. That is, it is possible to aim at lowering the dynamic spring constant, and to isolate the idling vibration even through the remote side vibration isolating unit 1B.

Next, when engine shake vibration having a frequency which is lower than the idling vibration, is inputted, the liquid flows through the first orifices 15 connecting between the main chamber 12 and the auxiliary chamber 16 in the both vibration isolating units 1A, 1B, respectively, so as to absorb and isolate the engine shake vibration. That is, in this embodiment, the selector means 3 is operated so as to introduce negative pressure into the both equilibrium chambers 13. In this case, since the negative pressure is continuously introduced through the passages 2, 2', the negative pressure is introduced into the equilibrium chambers 13 in the proximal side and remote side vibration isolating units 1A, 1B by an equal degree and accordingly, the equilibrium chambers 13 are held in a condition-that the volumes thereof are both zero. As a result, the liquid flows through the orifices 15 which are formed respectively in the vibration isolating units 1A, 1B between the main chamber 12 and the auxiliary chamber 16, and accordingly, the viscous resistance induced by the flow of the liquid exhibits a predetermined vibration damping force. By this vibration damping force (high damping characteristic), the damping (sustaining) of the above-mentioned engine shake is effected.

According to the present invention, the vibration isolating system for supporting the vibrator such as an engine, comprises a pair of liquid-sealing vibration isolating units arranged on opposite sides of the vibrator, a single selector means for introducing negative pressure or the atmospheric pressure into an equilibrium chambers constituting the vibration isolating units, respectively, and a control means for controlling the change-over operation of the selector means. With this arrangement, one of the vibration isolating units vibrates the diaphragm defining the equilibrium chamber in synchronization with the above-mentioned idling vibration so as to lower the dynamic spring constant of the overall vibration isolating unit, and the other one of the vibration isolating units allows the diaphragm defining the equilibrium chamber to freely vibrate so as to lower the dynamic spring constant, thereby making it possible to isolate the idling vibration.

Further, when engine shake vibration, which is substantial during the running of a vehicle, is inputted, negative pressure is continuously fed-into the equilibrium chambers in both vibration isolating units so as to promote the flow of liquid through the orifices in the both vibration isolating units, thereby making it possible to exhibit a high damping characteristic. As a result, it is possible to damp (restrain) engine shake vibration due to the abovementioned high damping characteristic.

Thus, according to the present invention, negative pressure or the like is introduced into the vibration isolating units through the single selector means, thereby making it possible to constitute an active control mounting device (ACM) with a relatively simple structure.

Other embodiments of the present inventions are discussed below with reference to FIGS. 1 to 7, 9, 10 and 12. The arrangement in another embodiment of the present invention comprises a pair of liquid-sealing type vibration isolating units 1A, 1B arranged in front and rear of the vibrator, or on the left and the right sides thereof, respectively, a selector means carrying out change-over operation for feeding negative pressure or the atmospheric pressure into the vibration isolating units 1A, 1B through passages 2, 2', and a phase control means 60 for controlling the phase of variation of pressure introduced through either one of the passages 2, 2'.

Figure 12:
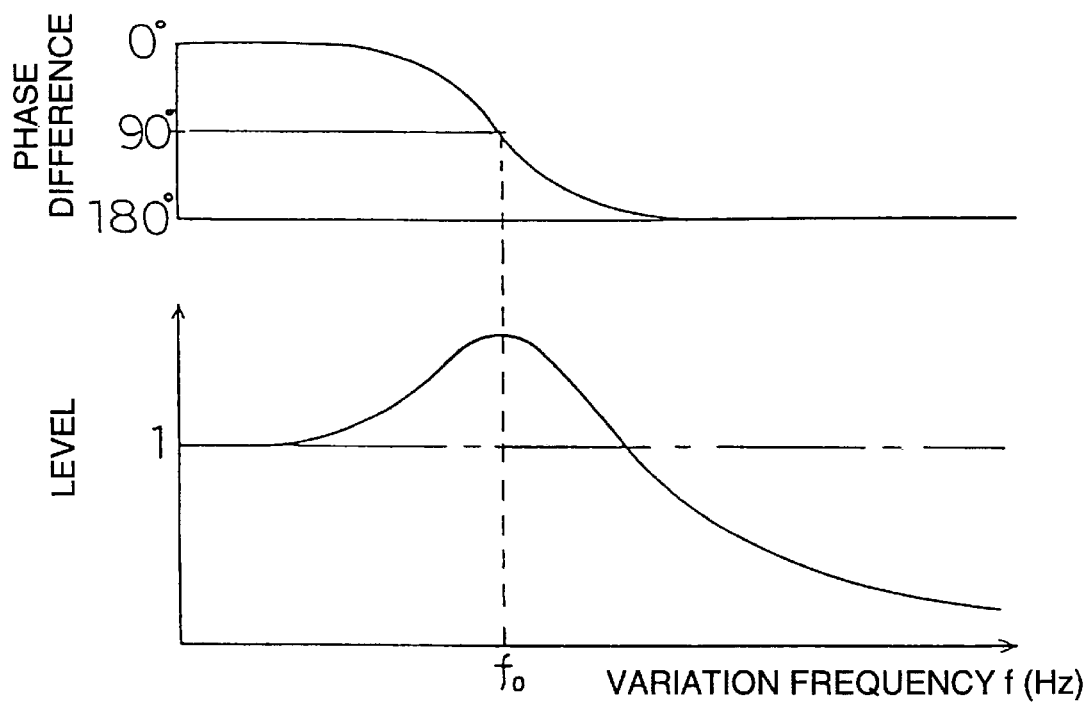
FIG. 12 is a graph showing a characteristic of a phase control means in a liquid-sealing type vibration isolating apparatus according to the present invention.

In the above-mentioned arrangement, this phase control means 60 is basically composed of, as shown in FIG. 8, an expansion chamber 61 having a predetermined volume, a diaphragm 62 and a mass 66 which are located in the expansion chamber 61, having a predetermined spring constant (Kd) and the mass weight (M). Further, the natural frequency (fo) of the phase control means 60 is specified in accordance with a ratio between this spring constant (Kd) and the mass (M). By suitably selecting a value of the natural frequency (fo) of the phase control means 60, as shown in FIG. 12, when the change-over frequency of the selector means 3 is f Hz variation of pressure introduced into the vibration isolating unit 1A through the phase control means 60, may have a predetermined phase difference with respect to variation of pressure directly introduced into the vibration isolating unit 1A on the other side. With this arrangement, pressure variation having predetermined a frequency and having a predetermined phase difference of 180 deg. between both isolating units 1A, 1B, the dynamic spring constants of the vibration isolating units 1A, 1B are reduced, and accordingly, an input value of a force caused by vibration of the engine and transmitted to the vehicle body can be reduced (or damped).

Figure 9:
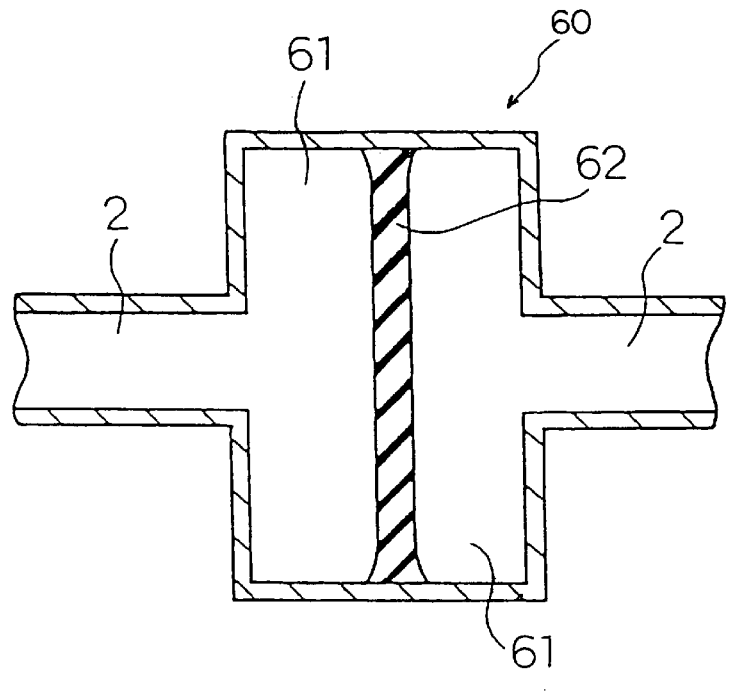
FIG. 9 is a view of a basic construction of a phase control means in a liquid-sealing type vibration isolating apparatus according to the present invention.
Figure 10:
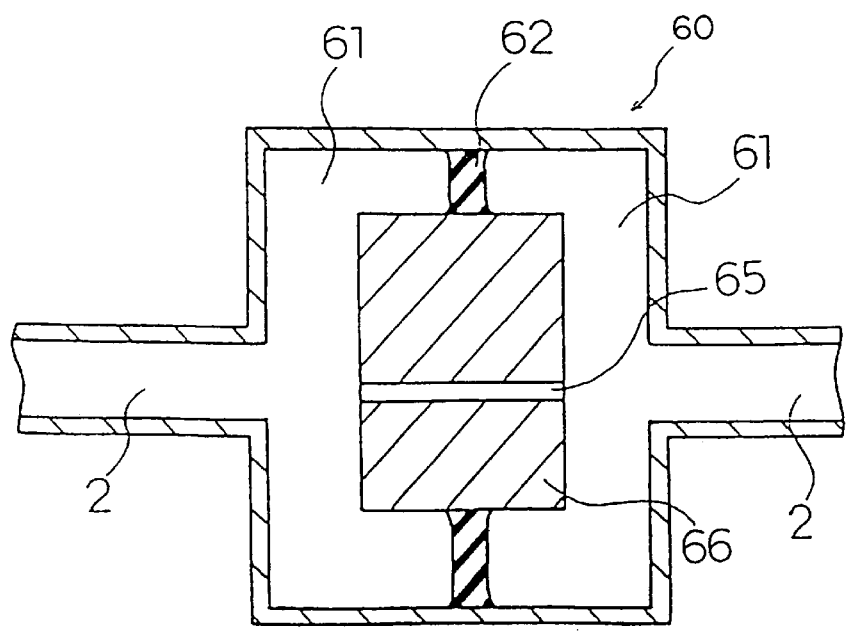
FIG. 10 is a sectional view illustrating a variant form of the phase control means in a liquid-sealing type vibration isolating apparatus according to the present invention.

It is noted that the phase control means 60 having the above-mentioned arrangement, may have such an arrangement that the diaphragm 62 has a mass 66 having a predetermined mass weight (M) as shown FIG. 10 in addition to the arrangement shown in FIG. 9 in which only the diaphragm 62 is provided. By suitably selecting a value of the mass weight (M) of the mass 66, the value of the natural frequency (fo) of the phase control means 60 can be optionally changed. Further, by suitably setting the value of this frequency (fo), the phase difference between the left and right vibration isolating units 1A, 1B in the vibration isolating system can be suitably selected.

Further, with the provision of the phase control means 60, as shown in FIG. 10, a communication hole 65 may be formed in the mass 66. With this arrangement, the diaphragm 62 is operated when the selector means 3 is operated under a condition in which the pressure varies at a predetermined frequency, and negative pressure having a predetermined pressure is also introduced into the vibration isolating unit 1B which is connected through the intermediary of the phase control means 60 through the communication hole 65 when the selector means 3 continuously introduces negative pressure. Accordingly, the volumes of the equilibrium chambers 13 in the both vibration isolating units 1A, 1B become zero due to introduction of the negative pressure, and in this condition, the liquid in the main chamber 12 in each of the both vibration isolating units 1A, 1B is caused to flow into the auxiliary chamber 16 thorough the first orifice 15. As a result, the damping forces of the vibration isolating units 1A, 1B is enhanced, thereby making it possible to aim at restraining engine shake. That is, the arrangement having such a type that has the communication hole 65 shown in FIG. 10, it is possible to exhibit an effect for absorbing and isolating engine shake vibration which seems to be serious during the running of a vehicle.

Next, the control means 5 for controlling the change-over operation of the selector valve 3 for selectively changing over and feeding negative pressure having a predetermined degree or the like into the passages 2, 2' and the phase control means 60 which are arranged as mentioned above, is composed of a microcomputer or the like basically composed of a computing means such as a micro-processor or the like, and detects vibration from the vibrator such as an engine so as to control the change-over operation of the selector means 3 in accordance with the detected vibration.

Negative pressure and the atmospheric pressure are alternately introduced into the equilibrium chamber 13 of the liquid-sealing type vibration isolating unit 1A as shown in FIG. 1 at a specific frequency. As a result, the pressure (volume) of the equilibrium chamber 13 varies so as to control variation in the pressure of liquid in the main chamber, which is caused by idling vibration inputted through the insulator 7. Accordingly, the absolute spring constant and the phase of the spring system constituted by the vibration isolating unit 1A are controlled.

Meanwhile, at this time, since the equilibrium chamber 13 of the vibration isolating unit 1A is communicated with the equilibrium chamber 13 of the other vibration isolating unit 1B through the phase control means 60, negative pressure and the atmospheric pressure introduced through the phase control means 60 is inputted (introduced) having a predetermined phase difference with respect to the pressure variation inputted to the equilibrium chamber of the vibration isolating unit 1A. In general, this phase difference is set to a value around 180 deg., and in a certain vibration system, the phase difference is sometimes set to 90 deg. or 0 deg. (the same phase). It is noted that the value of fo of the phase control means 60 is controlled by, for example, adjusting the mass weight (m) of the mass 66 shown in FIG. 5, in order to adjust (control) the phase difference, and accordingly, the value of the phase difference can be adjusted (controlled). In this condition, when the idling vibration is transmitted to the main chambers 12 (refer to FIG. 2) in the vibration isolating units 1A, 1B, the liquid in the main chambers 12 is subjected to pressure variation which is transmitted to the second diaphragms 11 defining the equilibrium chambers 13 through the second orifices 125 and the third liquid chambers 123. At this time, the second diaphragms 11 are operated so as to control the pressure variation of the liquid in the main chambers 12. Further, the equilibrium chambers 13 and the second diaphragms 11 of the left and right vibration isolating units 1A, 1B are operated having a phase difference of 180 deg. As a result, when idling vibration is inputted, the absolute spring constant and the phase are controlled, and accordingly, the vector value of the suspension system (vibration isolating system) becomes nearly equal to zero, thereby makes it possible to aim at isolating the idling vibration.

Next, engine shake vibration having a frequency which is lower than that of the idling vibration is inputted, the liquid flows through the first orifice 15 communicating between the main chamber 12 and the auxiliary chamber 16, as shown in FIG. 1, and accordingly, it is possible to aim at absorbing and isolating the engine shake. That is, in this embodiment, at first the selector means 3 is operated so as to continuously feed negative pressure into the equilibrium chambers 13 in the pair of vibration isolating units 1A, 1B shown in FIG. 7. Accordingly, in this embodiment, as shown in FIG. 10), the thin communication hole 65 is formed in the mass 66 located in the phase control means 60 so as to continuously introduce negative pressure even in the passage 2 provided therein with the phase control means 60. In this condition, the selector means 3 is operated so as to introduce negative pressure into the both equilibrium chambers. As a result, the volumes of the equilibrium chambers 13 are maintained to be zero. Accordingly, in each of the vibration isolating units 1A, 1B, the liquid flows through the first orifice 15 formed between the main chamber 12 and the auxiliary chamber 16, and accordingly, a viscous resistance induced by the flowing liquid generates a predetermined damping force. Further, this damping force (high damping characteristic) damps (restrains) the engine shake. Thus, in this embodiment, by operating the single selector means 3, the idling vibration and the engine shake can be efficiently absorbed and isolated.

According to the present invention, the vibration isolating device for supporting the vibrator such as an engine or the like, is composed of the pair of liquid-scaling type vibration isolating units provided on opposite sides of the vibrator, and the single selector means for introducing negative pressure or the atmospheric pressure into the equilibrium chambers in the vibration isolating units, either the equilibrium chamber in either one of the vibration isolating units being introduced thereinto with pressure variation through the phase control means. Accordingly, the diaphragms defining the equilibrium chambers in the vibration isolating chambers can be vibrated in synchronization with the idling vibration, thereby making it possible to optimize the absolute spring constant (overall spring constant) and the phase of the suspension system (vibration system) constituted by the vibration isolating units so as to reduce the resulted vector of the suspension system to a value which is nearly equal to zero. As a result, by operating only the single selector means, it is possible to aim at isolating the idling vibration.

Further, as to the engine shake which is substantial during the running of a vehicle, negative pressure can be continuously fed into both the equilibrium chambers through the communication hole formed in the mass constituting the phase control means so as to promote the flow of the liquid into the orifices in both the vibration isolating units, thereby making it possible to exhibit the high damping characteristic. As a result, the engine shake can be damped (restrained).

Thus, according to the invention, negative pressure or the like can be introduced into the vibration isolating units provided on the opposite sides of the vibrator through the single selector means, and accordingly, the active control mounting device can be formed in a relatively simple manner.

The operation of the above-mentioned arrangement will be explained with reference to FIGS. 1 and 11. Vibration from the vibrator is transmitted to the insulator 7 made of rubber materials, through the upper coupling member 9. Accordingly, the insulator 7 vibrates or deforms so as to absorb or isolate the substantial portion of the vibration. Thus, the vibration is isolated by the insulator 7. However, a portion of the vibration which cannot be isolated by the insulator 7 is isolated by the vibration isolating mechanism. The specific operation of the vibration isolating mechanism will be explained below. At first, when the idling vibration is inputted, the selector means 3 is operated so that negative pressure and the atmospheric pressure are alternately introduced into the equilibrium chamber at a specific frequency. That is, the selector means 3 is operated at a specific frequency so as to change the pressure (volume) of the equilibrium chamber 13 in order to absorb variation of pressure of the liquid in the main chamber 11. As a result, the dynamic spring constant of the spring system constituted by the insulator 7 and the vibration isolating mechanism can be reduced.

Figure 13:
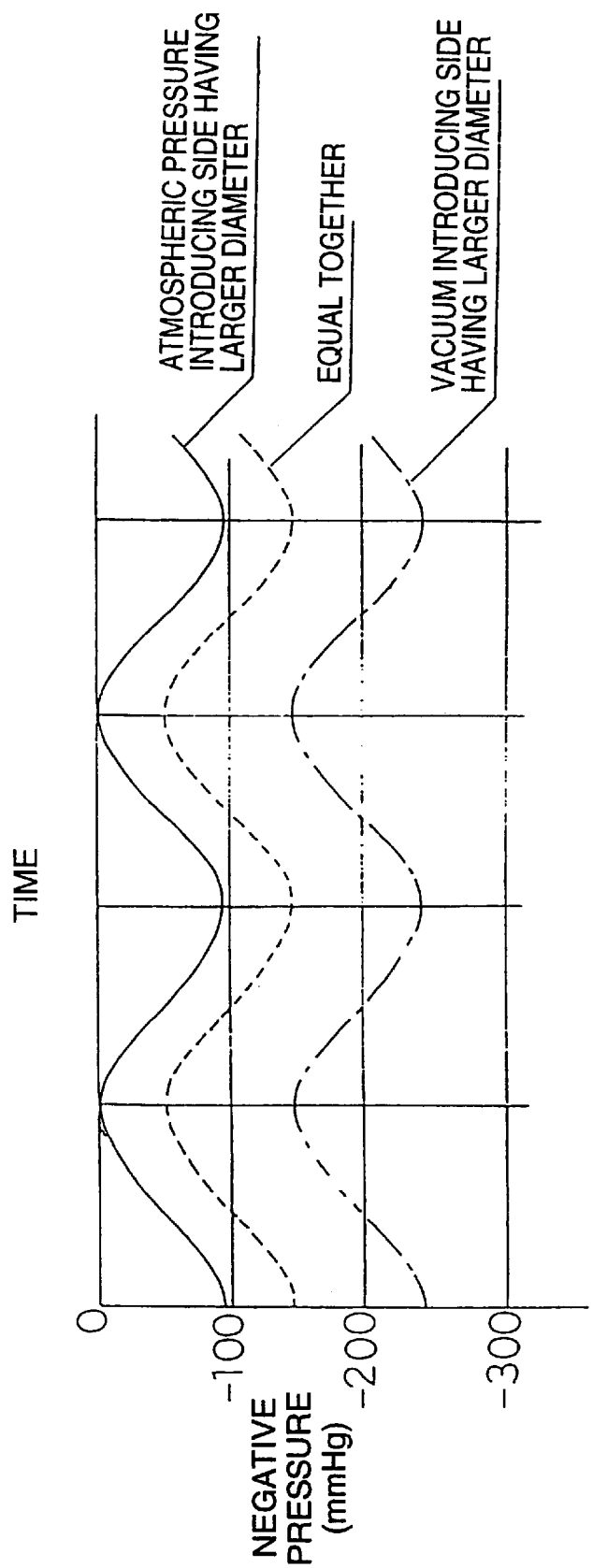
FIG. 13 is a graph showing an operating condition of a vibration isolating mechanism in a liquid-sealing type vibration isolating apparatus according to the present invention.

During the isolation of such idling vibration, the second diaphragm 11 is attracted by a predetermined stroke under negative pressure fed from the negative pressure source using intake negative pressure of the engine or the like. Meanwhile, when the atmospheric pressure is introduced, the second diaphragm 11 actuates (vibrates) a predetermined stroke by its self-restoring capability. Further, with this stroke (vibration) based upon the self-restoring capability, a predetermined volume of the atmospheric pressure (air) is introduced into the equilibrium chamber through the atmospheric pressure introducing passage 25 and the selector means 3. Since the cross-sectional area of the atmospheric pressure introducing passage 25 is set to be greater than that of the negative pressure introducing passage 21, the volume of fluid (atmospheric air) introduced into or discharged from the equilibrium chamber 13 is balanced between the negative pressure introducing stroke and the atmospheric pressure introducing stroke as indicated by the solid line in FIG. 13. Specifically, for example, should the diameter of the negative pressure introducing passage 21 be larger, the pressure of the equilibrium chamber 13 after the introduction of the atmospheric pressure would not be returned to a negative pressure zero condition (the atmospheric condition), and accordingly, the equilibrium chamber 13 and the second diaphragm 11 would actuate (vibrate) about a specific negative pressure value such as −200 mmHg as a center point as indicated by the one-dot chain line. On the other hand, if the diameter of the atmospheric pressure introducing passage 25 is greater, the pressure of the equilibrium chamber 13 after the introduction of the atmospheric pressure can be returned to a zero negative pressure condition. As a result, the work load made by the equilibrium chamber 13 and the second diaphragm 11 can be balanced between the introduction of negative pressure and the introduction of the atmospheric pressure, thereby making it possible to satisfactorily isolate idling vibration.

Further, when engine shake having a frequency which is lower than that of the idling vibration, is inputted, the liquid flows through the orifice 15 connecting between the main chamber 12 and the auxiliary chamber 16, and accordingly, the engine shake can be absorbed and isolated. That is, in this embodiment, negative pressure having a constant value is introduced into the equilibrium chamber 13 in the vibration isolating mechanism so as to attract the diaphragm 11 downward in order to set the volume of the equilibrium chamber 13 to zero. Thus, it is possible to prevent occurrence of the volume variation. In this condition, when vibration from the vibrator is transmitted to the insulator 7, the lower surface portion of the insulator 7 vibrates in response to this vibration so as to positively cause the liquid in the main chamber 12 to flow into the auxiliary chamber 16. As a result, the liquid in the main chamber 12 flows into the auxiliary chamber 16 through the first orifice 15. A viscous resistance inducted by the flow of the liquid produces a predetermined damping force which can restrain (damp) the engine shake.

It is noted that although the series type liquid-sealing tape vibration isolating apparatus as shown in FIG. 1 has been discussed in this embodiment, the present invention should not be limited to this specific apparatus. That is, a technical content similar to the above-mentioned embodiment can be applied to, for example, a cylindrical type liquid-sealing type vibration isolating apparatus in addition to the above-mentioned vibration isolating apparatus.

Since the cross-sectional area of the atmospheric pressure introducing passage led to the selector means is set to be larger than or substantially equal to that of the negative pressure introducing passage, the work load exhibited by the equilibrium chamber or the diaphragm can be balanced between the introduction of negative pressure and the introduction of the atmospheric pressure. As a result, the idling vibration can be efficiently isolated. Further, due to introduction of negative pressure, it is possible to aim at preventing fatigue of the diaphragm which displaces (deforms) only toward the attracting side.

That is, in the isolating operation of the idling vibration, the second diaphragm defining the equilibrium chamber is attracted by a predetermined stroke value by negative pressure fed from the predetermined negative pressure source during the introduction of negative pressure while the diaphragm actuates (vibrates) by a predetermined stroke value due to its self-restoring capability so that a predetermined volume of the atmospheric air is introduced into the equilibrium chamber through the atmospheric pressure introducing passage and the selector means during the introduction of the atmospheric pressure. Since the cross-sectional area of the atmospheric pressure introducing passage is set to be greater than that of the negative pressure introducing passage, the volume of fluid (the atmospheric air) which is introduced into or discharged from the equilibrium chamber can be balanced between the negative pressure introducing stroke and the atmospheric pressure introduction stroke. As a result, the work load exhibited by the liquid in the main chamber in the vibration isolating mechanism can be balanced between the introduction of negative pressure and the introduction of the atmospheric pressure.

Figure 14:
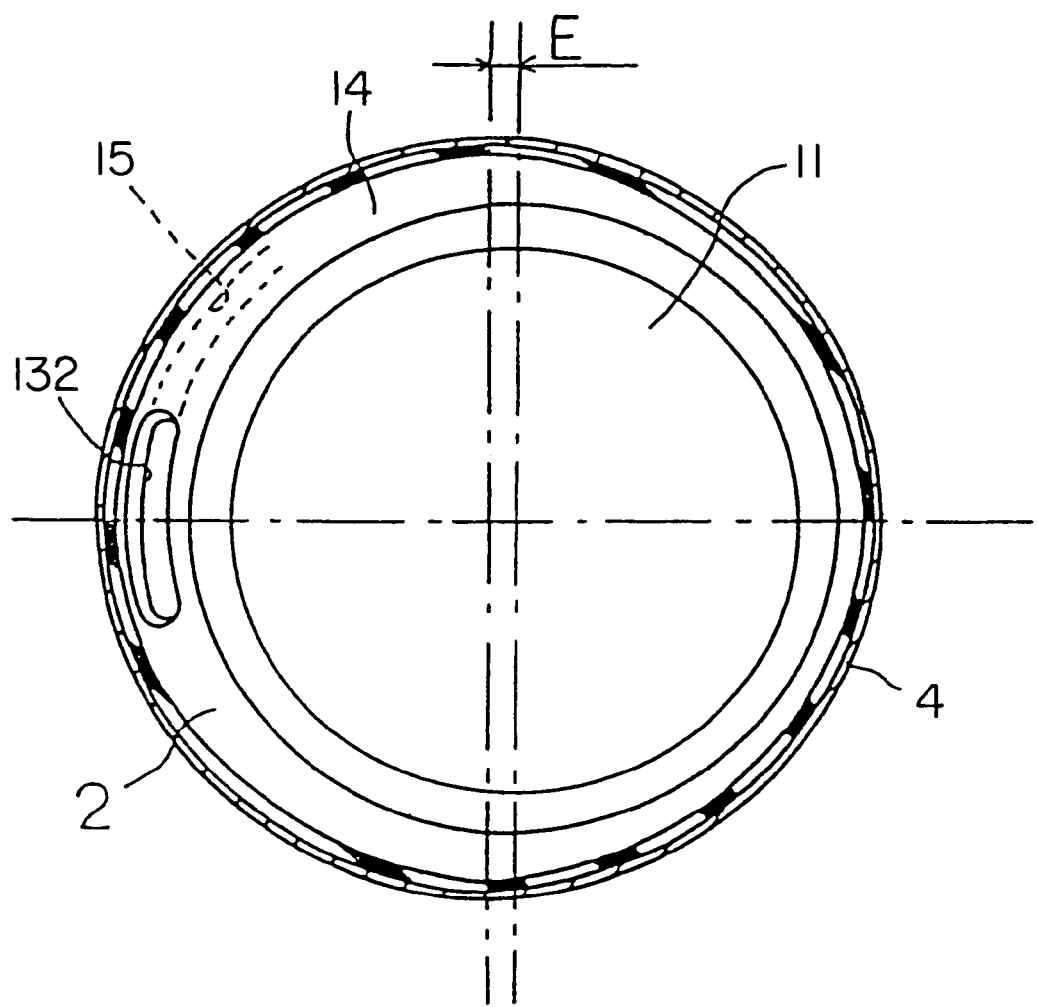
FIG. 14 is a cross-sectional view of an arrangement around a diaphragm in a liquid-sealing type vibration isolating apparatus according to the present invention.

An embodiment shown in FIG. 14 will be explained with reference to FIG. 1. This embodiment concerns a negative pressure introduction type fluid-in vibration isolator in which the equilibrium chamber 13 defined by the second diaphragm is arranged in the vicinity of the bottom portion of the inside of the main chamber 16, and negative pressure and the atmospheric pressure are alternately introduced into the equilibrium chamber 13 in synchronization with vibration having a specific frequency, such as idling vibration in order to vibrate the second diaphragm 11 defining the equilibrium chamber 13. As a result, the variation of pressure of liquid in the main chamber 12 can be controlled. In such a negative pressure introduction type liquid-in isolator, the second diaphragm 11 located between-the partition panel 14 and the main chamber 12 and defining the equilibrium chamber 13 into which negative pressure or the like is introduced, is arranged being offset from the center point of the ring-like orifice 15 by a predetermined offset degree (E) as shown in FIG. 11 and FIG. 14. Accordingly, the second diaphragm 11 defining the equilibrium chamber 13 widely extends over the bottom surface portion of the main chamber 12, except the suction port 132 of the first orifice 15. That is, the second diaphragm 11 can be formed by a large degree, thereby making it possible to enhance the durability of the second diaphragm which is subjected to the repetition of deformation caused by expansion and contraction of the equilibrium chamber 13, and further, the force induced by the equilibrium chamber 13, that is, the force for controlling the variation of pressure of liquid in the main chamber 12 can be increased.

As mentioned above, since the ring-like orifice communicating between the main chamber and the auxiliary chamber, and the second diaphragm which deforms in response to variation of pressure of liquid in the main chamber, and since the diaphragm is arranged being eccentric from the center point of the ring-like orifice by a predetermined eccentricity (offset value), vibration having a low frequency such as idling vibration or engine shake can be absorbed and isolated through the action of the insulator, the action of the liquid charged in the main chamber and the auxiliary chamber, and the flow of the liquid through the orifice communicating between the both main chamber and the auxiliary chamber. Further, even against vibration having a specific frequency in a high frequency range, the flexible member provided in the bottom portion of the main chamber is displaced (deformed) so as to avoid raising the pressure of liquid in the main chamber, thereby making it possible to constitute a low dynamic spring constant (low dynamic spring characteristic) for the vibration having the above-mentioned specific frequency.

As a result, it is possible to aim at isolating vibration relating to indistinguishable sound which is considered as vibration having a high frequency. In particular, according to the present invention, since the second diaphragm is arranged being eccentric from the ring center point of the ring-like orifice by a predetermined eccentricity, the area of the second diaphragm which receives pressure (liquid pressure) from the liquid in the main chamber, that is, the pressure receiving area can be enlarged. As a result, it is possible to enhance the liquid absorbing ability of the second diaphragm, and thereby making it possible to enhance the durable strength or the like of the second diaphragm against the repetitions of deformation. Further, in the negative pressure introduction type fluid-sealing type vibration isolating apparatus, the force induced in the equilibrium chamber can be increased, in addition to the enhancement of the durability.

Figure 15:
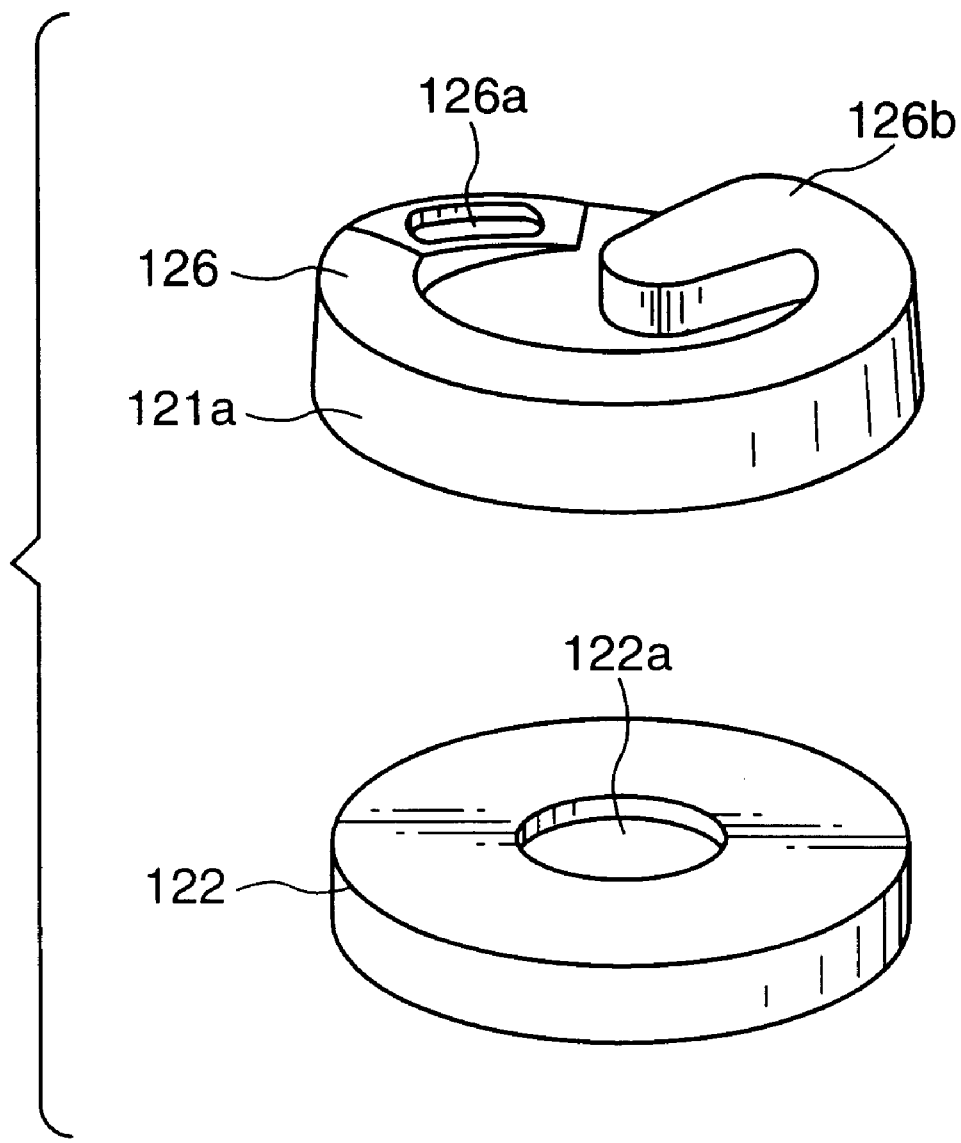
FIG. 15 is an exploded perspective view of a liquid-sealing type vibration isolating apparatus according to the present invention.

In the above-mentioned embodiment, there is provided the liquid-sealing type vibration isolating apparatus in which the partition panel 121 is press-fitted in the metal member 11*a*. FIG. 15 shows an example of this partition panel 121. An upper panel 121*a* is cylindrical having upper end closed, and has an arcuate groove 126 formed along the outer peripheral edge of the upper surface thereof. This groove 126 is provided with a tapered portion formed therein with a through-hole 126*a* on one end side thereof, and is formed on the other side with an end portion 126*b* which is bend toward the center of the panel surface.

The lower panel 121*b* is cylindrical, having a closed upper end, the outer diameter of the cylindrical lower panel 121*b* being set to be slightly lower than that of the upper panel 121*a*, and is formed at the center portion of the upper surface with a through-hole 122*a*.

The assembly of the upper panel 121*a* and the lower panel 121*b* is carried by press-fitting the lower panel 121*b* into the upper panel 121*a*, and securing the panels by press-fitting them into the metal member 11*a* of the second diaphragm 11 in the liquid-sealing type vibration isolating apparatus.

In the above-mentioned arrangement, the arcuate groove 126 formed in the upper panel 121*a* and the outer peripheral portion of the lower panel 121*b* define a second orifice 125 having one end which communicates with the main chamber 12 by way of the through-hole 126*a* formed in the upper panel 121*a*, and the other end which communicates with the third liquid chamber 123 by way of the other side end portion of the arcuate groove 12 and the through-hole 122 formed in the lower panel 121*b* and overlapped therewith. In the above-mentioned arrangement, the arcuate groove 126 has the other side end portion 126 which is bent toward the center thereof, the inlet port and outlet port of the second orifice 125, and the wall portion defining the inlet port and the outlet port are all provided on the upper panel 121 side. Accordingly, even though the upper panel 121*a* and the lower panel 121*b* are assembled together in any manner, the passage length can be always maintained to be constant. Accordingly, no positioning is required in the rotational direction during the assembly thereof, thereby making it possible to enhance and ease the workmanship of the assembly. Further, the passage length can be maintained to be constant, unevenness of products is small, thereby making it possible to stabilize the quality thereof.

In the above-mentioned liquid-sealing type vibration isolating apparatus, when the partition wall 14 is assembled, the second diaphragm 11 is fitted in the upper opening of the body portion of the partition wall 14 under the atmospheric environment. Then, the partition wall 14 and the first diaphragm 17 are fitted in this order in the lower half portion of the body fixture 4, and thereafter, the lower end edge of the body fixture 4 is caulked so as to fix them. Thereafter, the cap 10 is fitted above the insulator 7 which is then fixed to the vehicle body by means of a leg portion 101, and which is coupled to the engine by means of the upper coupling portion 9 projecting from the upper opening of the cap 10.

At this time, the upper negative pressure pipe 19*a* and a plurality of protrusions 14*a* are fitted in the plurality of cut-out parts 41 in the body fixture 4, and are fixed at the topmost parts of the cut-out parts 41. Thus, the negative pressure pipe 19*a* can be taken out simultaneously with the assembly, and further, since no adjustment for the assembling position of the partition wall is required, the ease and workmanship of the assembly can be greatly enhanced. Further, the sealing of the main chamber 12 can be made by making the insulator 7 and the partition wall 14 into close contact with each other on the topmost portion of the body fixture 4 where no cut-out parts are present, and the sealing of the auxiliary chamber 16 can be made by making the outer periphery of the first diaphragm 17 into close contact with the partition wall 14. Thus, the sealability is not deteriorated even though the negative pressure pipe 19*a* is taken out. Further, since the press-fitting into the cap 10 can be made on the upper portion of the body fixture 4 where no cut-out parts are present, there is no risk of coming off.

It is noted that the present invention can be applied to any liquid-sealing type vibration isolating apparatus if the latter has such an arrangement that a portion of the partition panel is movable, and the control means is provided in the partition panel while the coupling portion for the exterior is provided at the outer periphery of the partition panel. Therefore, it is possible to simplify the manufacturing process so as to greatly enhance the workmanship for the assembly.

What is claimed is:

1. A liquid-sealing type vibration isolating apparatus comprising:

a first coupling member attachable to a vibrator;

a second coupling member attachable to a member on a vehicle body;

an insulator interposed between the first coupling member and the second coupling member for absorbing and isolating vibration from the vibrator;

a vibration isolating mechanism including:

a main chamber having a chamber wall formed by one portion of the insulator and charged therein with liquid;

an auxiliary chamber and a partition panel partitioned from the main chamber across a partition wall and communicating with the main chamber through an orifice; and a chamber wall portion formed by a first diaphragm, an air chamber partitioned from the auxiliary chamber across the diaphragm, and an equilibrium chamber partitioned from the main chamber across a second diaphragm;

selector means for carrying out change-over operation so as to introduce negative pressure or the atmospheric pressure into the equilibrium chamber in the vibration isolating mechanism;

control means for controlling the change-over operation of the selector means;

a negative pressure tank having a predetermined volume arranged between a negative pressure source using intake negative pressure of an engine and the selector means;

a check-valve provided between the negative pressure source and the negative pressure tank for introducing only negative pressure into the negative pressure tank; and drive means for operating a selector valve in the selector means, the drive means including a solenoid mechanism;

wherein the partition wall is composed of a body portion having an outer peripheral portion formed therein with the orifice, the second diaphragm provided on the main chamber side of the body portion and defining the equilibrium chamber between itself and the body portion, and the partition panel arranged between the second diaphragm and the main chamber, defining a third liquid chamber between itself and the second diaphragm, and formed therein with a second orifice; and the partition panel partitioning between the main chamber and the equilibrium chamber is formed of two panels which are joined to each other, and the second orifice is formed in the two panels so as to be circumferentially extended, the second orifice communicates at one end with the main chamber and the other end with the equilibrium chamber, one of the two panels is formed in its outer peripheral portion with an arcuate groove so as to define a space serving as the second orifice between itself and the other one of the partition panels, a communication hole communicates with the main chamber or the auxiliary chamber is formed in a wall surface at one end side of the groove, the other side end portion thereof is bent toward the center of the panel, and a through-hole serving as a communication hole communicated with the main chamber or the auxiliary chamber is formed in the center portion of the other one of the panels so that the through-hole is overlapped with the other side end portion of the groove.

2. A liquid-sealing type vibration isolating apparatus as set forth in claim 1, wherein convex parts are formed on a center portion and an outer peripheral portion of the second diaphragm or the body portion.

3. A liquid-sealing type vibration isolating apparatus as set forth in claim 1, wherein the second diaphragm is arranged eccentric from a center point of a ring-like orifice by a predetermined eccentricity.

4. A liquid-sealing type vibration isolating apparatus comprising:

a first coupling member attachable to a vibrator;

a second coupling member attachable to a member on a vehicle body;

an insulator interposed between the first coupling member and the second coupling member for absorbing and isolating vibration from the vibrator;

a vibration isolating mechanism including:

a main chamber having a chamber wall formed by one portion of the insulator and charged therein with liquid;

an auxiliary chamber and a partition panel partitioned from the main chamber across a partition wall and communicating with the main chamber through an orifice; and a chamber wall portion formed by a first diaphragm, an air chamber partitioned from the auxiliary chamber across the diaphragm, and an equilibrium chamber partitioned from the main chamber across a second diaphragm;

selector means for carrying out change-over operation so as to introduce negative pressure or the atmospheric pressure into the equilibrium chamber in the vibration isolating mechanism;

control means for controlling the change-over operation of the selector means;

a negative pressure tank having a predetermined volume arranged between a negative pressure source using intake negative pressure of an engine and the selector means;

a check-valve provided between the negative pressure source and the negative pressure tank for introducing only negative pressure into the negative pressure tank; and drive means for operating a selector valve in the selector means, the drive means including a solenoid mechanism;

wherein the partition wall is composed of a body portion having an outer peripheral portion formed therein with the orifice, the second diaphragm provided on the main chamber side of the body portion and defining the equilibrium chamber between itself and the body portion, and the partition panel arranged between the second diaphragm and the main chamber, defining a third liquid chamber between itself and the second diaphragm, and formed therein with a second orifice; and a cylindrical body fixture is joined to an outer periphery of the insulator, having a lower end portion extending downward, and a plurality of protrusions corresponding to a plurality of cut-out parts formed on an outer periphery of the partition wall, the partition wall is fitted and secured in the body fixture so that the protrusions are projected outward from the cut-out parts, and one of the protrusions is formed in a tubular shape so as to serve as a coupling portion for coupling the control means with an external drive means.

5. A liquid-sealing type vibration isolating apparatus as set forth in claim 4, wherein convex parts are formed on a center portion and an outer peripheral portion of the second diaphragm or the body portion.

6. A liquid-sealing type vibration isolating apparatus as set forth in claim 4, wherein the second diaphragm is arranged eccentric from a center point of a ring-like orifice by a predetermined eccentricity.

7. A liquid-sealing type vibration isolating apparatus comprising:

a first coupling member attachable to a vibrator;

a second coupling member attachable to a member on a vehicle body;

an insulator interposed between the first coupling member and the second coupling member for absorbing and isolating vibration from the vibrator;

a vibration isolating mechanism including:

a main chamber having a chamber wall formed by one portion of the insulator and charged therein with liquid;

an auxiliary chamber and a partition panel partitioned from the main chamber across a partition wall and communicating with the main chamber through an orifice; and a chamber wall portion formed by a first diaphragm, an air chamber partitioned from the auxiliary chamber across the diaphragm, and an equilibrium chamber partitioned from the main chamber across a second diaphragm;

selector means for carrying out change-over operation so as to introduce negative pressure or the atmospheric pressure into the equilibrium chamber in the vibration isolating mechanism:

control means for controlling the change-over operation of the selector means;

a negative pressure tank having a predetermined volume arranged between a negative pressure source using intake negative pressure of an engine and the selector means;

a check-valve provided between the negative pressure source and the negative pressure tank for introducing only negative pressure into the negative pressure tank; and drive means for operating a selector valve in the selector means, the drive means including a solenoid mechanism;

wherein a negative pressure sub-tank is provided proximate to the selector means on a side remote from the equilibrium chamber, the sub-negative pressure tank having a volume which is equal to or larger than the sum of the volume of the equilibrium chamber and volume of a passage communicating between the equilibrium chamber and the selector means.

8. A liquid-sealing type vibration isolating apparatus as set forth in claim 7, wherein the selector valve of the selector means is operated so as to introduce an atmospheric pressure into the equilibrium chamber always during a rest of the engine.

9. A liquid-sealing type vibration isolating apparatus comprising:

a first coupling member attachable to a vibrator;

a second coupling member attachable to a member on a vehicle body;

an insulator interposed between the first coupling member and the second coupling member for absorbing and isolating vibration from the vibrator;

a vibration isolating mechanism including:
    a main chamber having a chamber wall formed by one portion of the insulator and charged therein with liquid;
    an auxiliary chamber and a partition panel partitioned from the main chamber across a partition wall and communicating with the main chamber through an orifice; and
    a chamber wall portion formed by a first diaphragm, an air chamber partitioned from the auxiliary chamber across the diaphragm, and an equilibrium chamber partitioned from the main chamber across a second diaphragm;

selector means for carrying out change-over operation so as to introduce negative pressure or the atmospheric pressure into the equilibrium chamber in the vibration isolating mechanism;

control means for controlling the change-over operation of the selector means;

a negative pressure tank having a predetermined volume arranged between a negative pressure source using intake negative pressure of an engine and the selector means;

a check-valve provided between the negative pressure source and the negative pressure tank for introducing only negative pressure into the negative pressure tank; and drive means for operating a selector valve in the selector means, the drive means including a solenoid mechanism;

wherein a solenoid constituting the selector means is operated in a direction having an angle of greater than 45 deg. with respect to a working axis of the liquid-sealing type vibration isolating apparatus.

10. A liquid-sealing type vibration isolating apparatus comprising:

a first coupling member attachable to a vibrator;

a second coupling member attachable to a member on a vehicle body;

an insulator interposed between the first coupling member and the second coupling member for absorbing and isolating vibration from the vibrator;

a vibration isolating mechanism including:
    a main chamber having a chamber wall formed by one portion of the insulator and charged therein with liquid;
    an auxiliary chamber and a partition panel partitioned from the main chamber across a partition wall and communicating with the main chamber through an orifice;
    a chamber wall portion formed by a first diaphragm, an air chamber partitioned from the auxiliary chamber across the diaphragm, and an equilibrium chamber partitioned from the main chamber across a second diaphragm;

selector means for carrying out change-over operation so as to introduce negative pressure or the atmospheric pressure into the equilibrium chamber in the vibration isolating mechanism;

control means for controlling the change-over operation of the selector means;

a negative pressure tank having a predetermined volume arranged between a negative pressure source using intake negative pressure of an engine and the selector means;

a check-valve provided between the negative pressure source and the negative pressure tank for introducing only negative pressure into the negative pressure tank; and drive means for operating a selector valve in the selector means, the drive means including a solenoid mechanism;

wherein a passage for introducing an atmospheric pressure into the selector means for changing over the introduction of negative pressure and the atmospheric pressure has a cross-sectional area which is equal to or larger than that of a passage for introducing negative pressure into the selector means.

11. A liquid-sealing type vibration isolating apparatus comprising:

a main chamber having a chamber wall formed of an insulator made of a rubber elastic material having a large wall thickness, an auxiliary chamber having a chamber wall formed by a portion of a first diaphragm formed of a rubber membrane having a small wall thickness and partitioned from the main chamber across a partition wall, a first orifice communicating between the main chamber and the auxiliary chamber, for reducing vibration having a predetermined low frequency under action of liquid flowing through the first orifice, a second diaphragm formed of an elastic membrane extending in the partition wall which is hollow, a third liquid chamber formed on the main chamber side of the second diaphragm, an equilibrium chamber formed on the auxiliary chamber side of the second diaphragm, for introducing thereinto negative pressure, a second orifice communicating between the third liquid chamber and the main chamber, selector means for carrying out a change-over operation so as to introduce negative pressure or the atmospheric pressure into the equilibrium chamber in the vibration isolating mechanism, control means for controlling the change-over operation of the selector means and being effective at a frequency which is higher than that at which the first orifice is effective, more than one of protrusions are formed on one of or both of the outer surface of the second diaphragm and the outer surface of the partition wall so as to define small spaces remaining between the second diaphragm and the partition wall when negative pressure is introduced in the equilibrium chamber;

wherein the partition wall is composed of a body portion having an outer peripheral portion formed therein with the first orifice, the second diaphragm is provided on the main chamber side of the body portion and defines the equilibrium chamber between itself and the body portion, and a partition panel arranged between the second diaphragm and the main chamber, defining the third liquid chamber between itself and the second diaphragm, and formed therein with the second orifice.

12. A liquid-sealing type vibration isolating apparatus as set forth in claim 11, wherein convex parts are formed on a center portion and an outer peripheral portion of the second diaphragm or the body portion.

13. A liquid-in vibrator as set forth in claim 11, wherein:

the partition panel partitioning between the main chamber and the equilibrium chamber is formed of two panels which are joined to each other, and the second orifice is formed in the two panels so as to be circumferentially extended, the second orifice being in communication at one end with the main chamber and the other end with the equilibrium chamber, one of the two panels is formed in its outer peripheral portion with an arcuate groove so as to define a space serving as the orifice between itself and the other one of the partition panels, a communication hole communicating with the main chamber or the auxiliary chamber is formed in a wall surface at one end side of the groove, the other side end portion thereof is bent toward the center of the panel, and a through-hole serving as a communication hole communicating with the main chamber or the auxiliary chamber is formed in the center portion of the other one of the panels so that the through-hole is overlapped with the other side end portion of the groove.

14. A liquid-sealing type vibration isolating apparatus as set forth in claim 11, wherein the second diaphragm is arranged, eccentric from a center point of a ring-like orifice by a predetermined eccentricity.

15. A liquid-sealing type vibration isolating apparatus comprising:

a main chamber having a chamber wall formed of an insulator made of a rubber elastic material having a large wall thickness, an auxiliary chamber having a chamber wall formed by a portion of a first diaphragm formed of a rubber membrane having a small wall thickness and partitioned from the main chamber across a partition wall, a first orifice communicating between the main chamber and the auxiliary chamber, for reducing vibration having a predetermined low frequency under action of liquid flowing through the first orifice, a second diaphragm formed of an elastic membrane extending in the partition wall which is hollow, a third liquid chamber formed on the main chamber side of the second diaphragm, an equilibrium chamber formed on the auxiliary chamber side of the second diaphragm, for introducing thereinto negative pressure, a second orifice communicating between the third liquid chamber and the main chamber, selector means for carrying out a change-over operation so as to introduce negative pressure or the atmospheric pressure into the equilibrium chamber in the vibration isolating mechanism, and control means for controlling the change-over operation of the selector means and being effective at a frequency which is higher than that at which the first orifice is effective, more than one of convex portions are formed on one of or both of the outer surface of the second diaphragm and the outer surface of the partition wall so as to define small spaces remaining between the second diaphragm and the partition wall when negative pressure is introduced in the equilibrium chamber, wherein a passage for introducing atmospheric pressure into the selector means for changing over the introduction of negative pressure and the atmospheric pressure has a cross-sectional area which is equal to or larger than that of a passage for introducing negative pressure into the selector means.

16. A liquid-sealing type vibration isolating apparatus comprising:

a main chamber having a chamber wall formed of an insulator made of a rubber elastic material having a large wall thickness, an auxiliary chamber having a chamber wall formed by a portion of a first diaphragm formed of a rubber membrane having a small wall thickness and partitioned from the main chamber across a partition wall, a first orifice communicating between the main chamber and the auxiliary chamber, for reducing vibration having a predetermined low frequency under action of liquid flowing through the first orifice, a second diaphragm formed of an elastic membrane extending in the partition wall which is hollow, a third liquid chamber formed on the main chamber side of the second diaphragm, an equilibrium chamber formed on the auxiliary chamber side of the second diaphragm, for introducing thereinto negative pressure, a second orifice communicating between the third liquid chamber and the main chamber, selector means for carrying out a change-over operation so as to introduce negative pressure or the atmospheric pressure into the equilibrium chamber in the vibration isolating mechanism, control means for controlling the change-over operation of the selector means and being effective at a frequency which is higher than that at which the first orifice is effective, more than one of convex portions are formed on one of or both of the outer surface of the second diaphragm and the outer surface of the partition wall so as to define small spaces remaining between the second diaphragm and the partition wall when negative pressure is introduced in the equilibrium chamber, wherein a cylindrical body fixture is joined to an outer periphery of the insulator, having a lower end portion extending downward, and a plurality of protrusions corresponding to a plurality of cut-out parts are formed on an outer periphery of-the partition wall, the partition wall is fitted and secured in the body fixture so that the protrusions are projected outward from the cut-out parts, and one of the protrusions is formed in a tubular shape so as to serve as a coupling portion for coupling the control means with an external drive means.

17. A liquid-sealing type vibration isolating apparatus as set forth in claim 16, wherein the tubular protrusion is a pipe body press-fitted in the partition wall.

18. A vibration isolating system comprising:
two liquid-sealing type vibration isolating units provided on both sides of a vibrator, and each composed of:
an upper coupling member attached to the vibrator,
a lower coupling member attached to a member in a vehicle body,
an insulator interposed between the upper and lower coupling members, for absorbing and isolating vibration from the vibrator,
a main chamber having a chamber wall formed from a portion of the insulator and charged therein with liquid,
an auxiliary chamber communicating with the main chamber through an orifice and having a wall chamber a portion of which is formed by a first diaphragm,
an air chamber partitioned from the auxiliary chamber across the first diaphragm, and
an equilibrium chamber partitioned from the main chamber across a second diaphragm;
selector means communicating with the equilibrium chambers in the two liquid-sealing type vibration isolating units, for carrying out a change-over operation so as to continuously introduce either one of negative pressure and atmospheric pressure into the equilibrium chambers, respectively, or to alternately introduce the negative pressure or the atmospheric pressure into the equilibrium chamber, the selector means being connected with one of the equilibrium chamber so as to transmit pressure variation in synchronized frequency with engine vibration, and being connected with the other one of the equilibrium chambers by way of a changing means for changing at least one of a phase and an amplitude; and
control means for controlling the changeover operation of the selector means;
wherein said changing means is a phase changing means, and
said phase changing means is composed of an expansion chamber provided in a passage communicating between the selector means and one of the equilibrium chambers and having a predetermined volume, a diaphragm provided in the expansion chamber, and a mass provided to the diaphragm and having a predetermined mass weight.

19. A vibration isolating system as set forth in claim 18, wherein a negative pressure tank having a predetermined volume is arranged between a negative pressure source using intake negative pressure of an engine and the selector means, the negative pressure tank is provided with a check valve for introducing only negative pressure thereinto the negative pressure tank, and drive means is provided for operating a selector valve in said selector means, said drive means including a solenoid mechanism.

20. A vibration isolating system as set forth in claim 18, wherein more than one of convex parts are formed on one of both of the outer surface of said second diaphragm and an inner surface of said partition wall so that small spaces are defined while being left between said second diaphragm and the inner surface of said partition wall.

21. A vibration isolating system comprising:
two liquid-sealing type vibration isolating units provided on both sides of a vibrator, and each composed of:
an upper coupling member attached to the vibrator,
a lower coupling member attached to a member in a vehicle body,
an insulator interposed between the upper and lower coupling members, for absorbing and isolating vibration from the vibrator,
a main chamber having a chamber wall formed from a portion of the insulator and charged therein with liquid,
an auxiliary chamber communicating with the main chamber through an orifice and having a wall chamber a portion of which is formed by a first diaphragm,
an air chamber partitioned from the auxiliary chamber across the first diaphragm, and
an equilibrium chamber partitioned from the main chamber across a second diaphragm;
selector means communicating with the equilibrium chambers in the two liquid-sealing type vibration isolating units, for carrying out a change-over operation so as to continuously introduce either one of negative pressure and atmospheric pressure into the equilibrium chambers, respectively, or to alternately introduce the negative pressure or the atmospheric pressure into the equilibrium chamber, the selector means being connected with one of the equilibrium chamber so as to transmit pressure variation in synchronized frequency with engine vibration, and being connected with the other one of the equilibrium chambers by way of a changing means for changing at least one of a phase and an amplitude; and
control means for controlling the changeover operation of the selector means;
wherein the other one of said vibration isolating units is connected through a passage which is formed so that pressure variation is not transmitted thereto with a synchronized frequency with the engine vibration.

22. A vibration isolating system as set forth in claim 21, wherein a negative pressure tank having a predetermined volume is arranged between a negative pressure source using intake negative pressure of an engine and the selector means, the negative pressure tank is provided with a check valve for introducing only negative pressure thereinto the negative pressure tank, and drive means is provided for operating a selector valve in said selector means, said drive means including a solenoid mechanism.

23. A vibration isolating system as set forth in claim 21, wherein more than one of convex parts are formed on one of both of the outer surface of said second diaphragm and an inner surface of said partition wall so that small spaces are defined while being left between said second diaphragm and the inner surface of said partition wall.

* * * * *

UNITED STATES PATENT AND TRADEMARK OFFICE
CERTIFICATE OF CORRECTION

PATENT NO.    : 6,082,718
DATED         : July 4, 2000
INVENTOR(S)   : Yamada et al.

It is certified that error appears in the above-identified patent and that said Letters Patent is hereby corrected as shown below:

Title page,
Change "[22] Filed: Mar. 2, 1998" to
-- [22] Filed: Mar. 3, 1998 --

Please delete item [63]

Column 1,
Line 6, change "is a continuation-in-part of" to -- application is related to --.

Signed and Sealed this

Fifth Day of March, 2002

JAMES E. ROGAN
Director of the United States Patent and Trademark Office